United States Patent
Kaneda et al.

(10) Patent No.: US 6,424,372 B1
(45) Date of Patent: *Jul. 23, 2002

(54) ELECTRONIC IMAGE-MOVEMENT CORRECTING DEVICE WITH A VARIABLE CORRECTION STEP FEATURE

(75) Inventors: Kitahiro Kaneda, Kanagawa-ken; Kazuya Inou, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,428

(22) Filed: Oct. 19, 1998

Related U.S. Application Data

(62) Division of application No. 08/904,455, filed on Aug. 1, 1997, now Pat. No. 5,825,415.

(30) Foreign Application Priority Data

Dec. 17, 1993 (JP) .............................. 5-344413
Dec. 17, 1993 (JP) .............................. 5-344414

(51) Int. Cl.[7] .............................................. H04N 5/228
(52) U.S. Cl. ....................................... 348/208; 348/240
(58) Field of Search ............................... 348/208, 240, 348/207, 699; H04N 5/232

(56) References Cited

U.S. PATENT DOCUMENTS

| | | | |
|---|---|---|---|
| 2,829,557 A | 4/1958 | Jensen | 88/34 |
| 2,959,088 A | 11/1960 | Räntsch | 88/1 |
| 5,189,518 A | 2/1993 | Nishida | 348/208 |
| 5,204,741 A | 4/1993 | Sakaguchi | 348/208 |
| 5,291,300 A | 3/1994 | Ueda | 348/208 |
| 5,371,539 A | 12/1994 | Okino et al. | 348/208 |
| 5,712,474 A | * 1/1998 | Naneda | 348/208 |
| 5,825,415 A | * 10/1998 | Kaneda et al. | 348/208 |
| 5,982,421 A | * 11/1999 | Inou et al. | 348/208 |

FOREIGN PATENT DOCUMENTS

| | | | | |
|---|---|---|---|---|
| EP | 0541092 | * 12/1993 | | H04N/5/232 |
| JP | 6-237411 | 8/1994 | | |
| JP | 4-352574 | 12/1994 | | |
| JP | 63-166370 | 7/1998 | | |

* cited by examiner

Primary Examiner—Wendy R. Garber
Assistant Examiner—Aung S. Moe
(74) Attorney, Agent, or Firm—Fitzpatrick, Cella, Harper & Scinto

(57) ABSTRACT

An image-shake correcting device includes a motion-vector detecting circuit for detecting a motion vector relative to pictures, an electronic correcting circuit for electronically correcting an image shake on the basis of the motion vector detected by the motion-vector detecting circuit, an image enlarging circuit for performing enlargement processing on an image signal outputted from the electronic correcting circuit, and a control circuit for controlling a correction step of the electronic correcting circuit on-the basis of an image enlargement ratio of the image enlarging circuit to set the correction step to an optimum state.

11 Claims, 18 Drawing Sheets

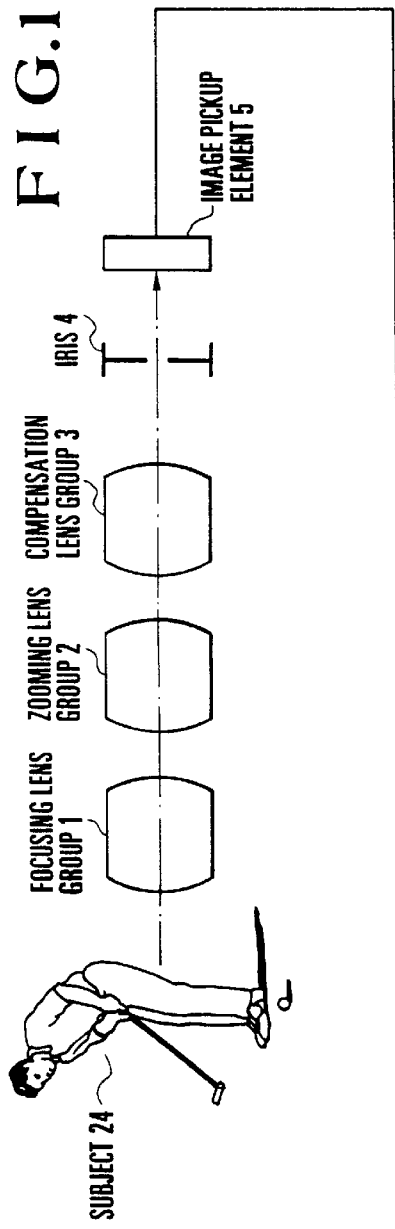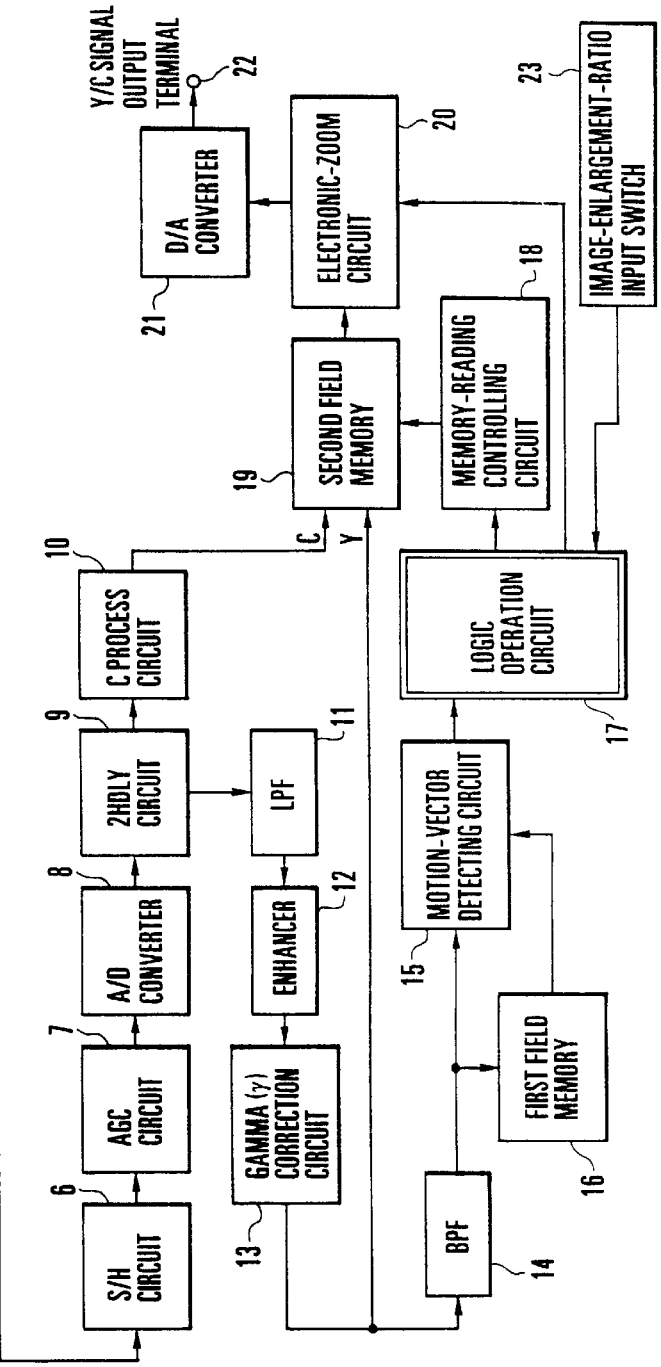
FIG.1

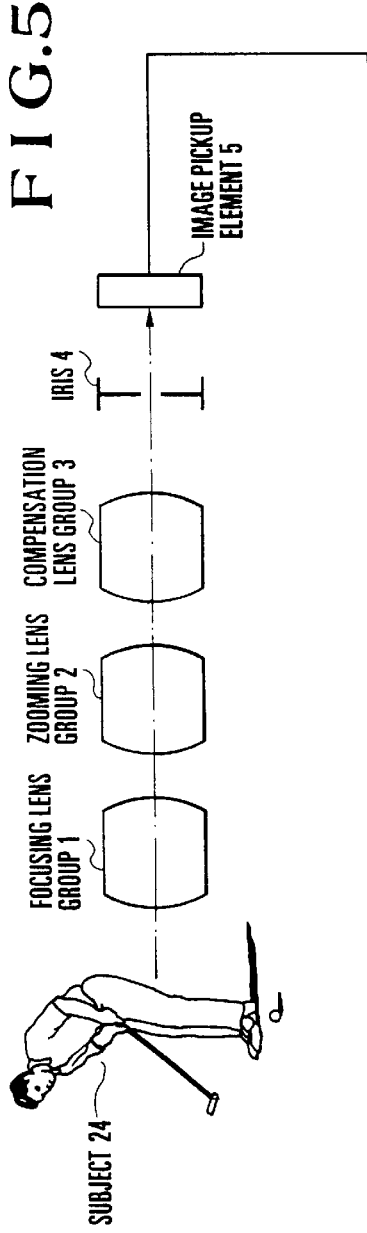
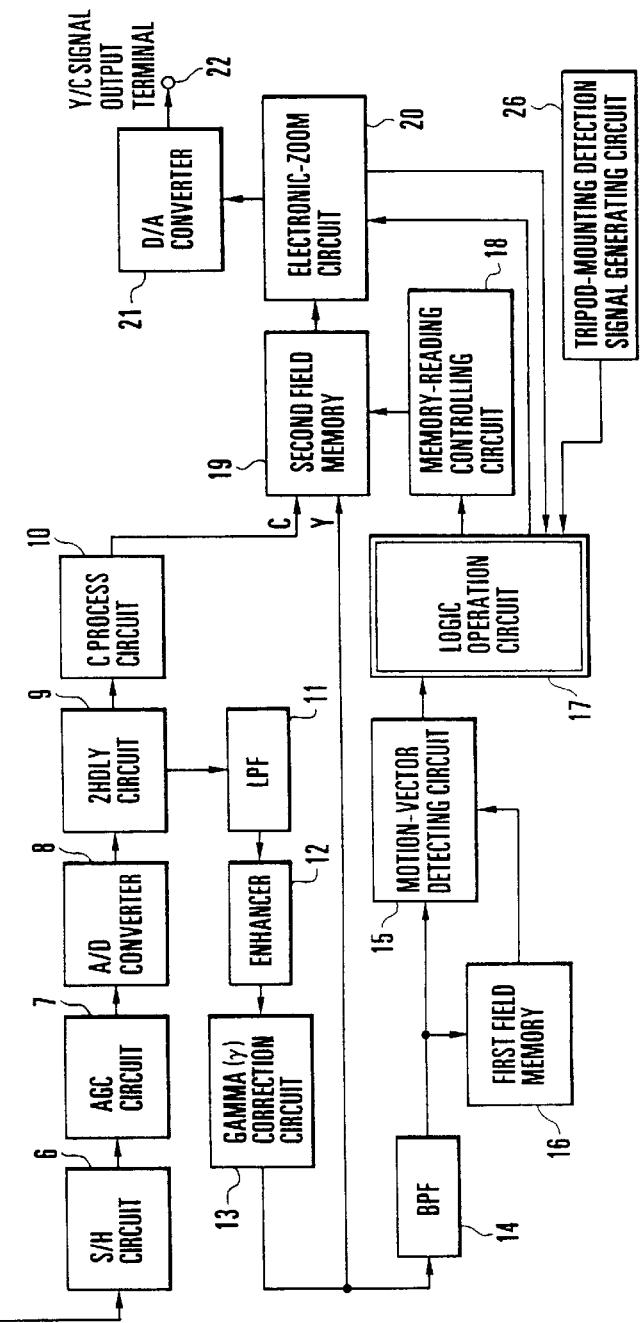
FIG. 5

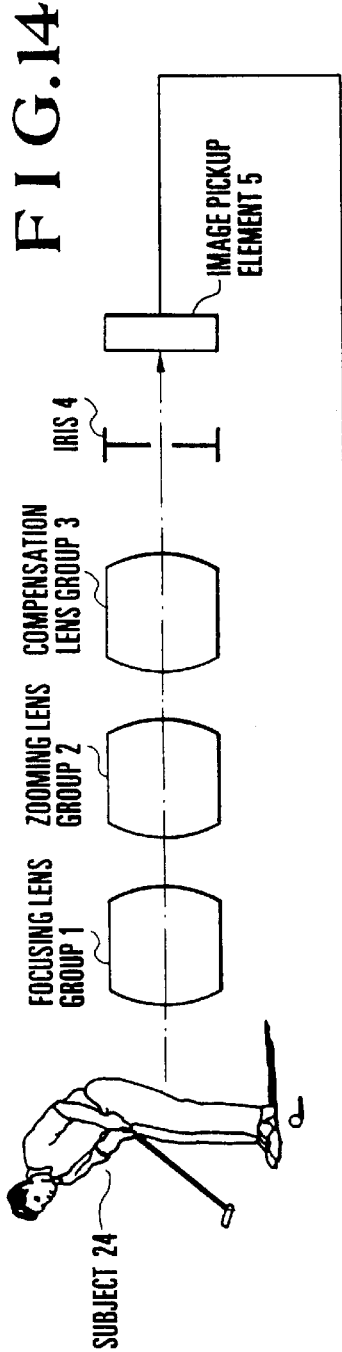
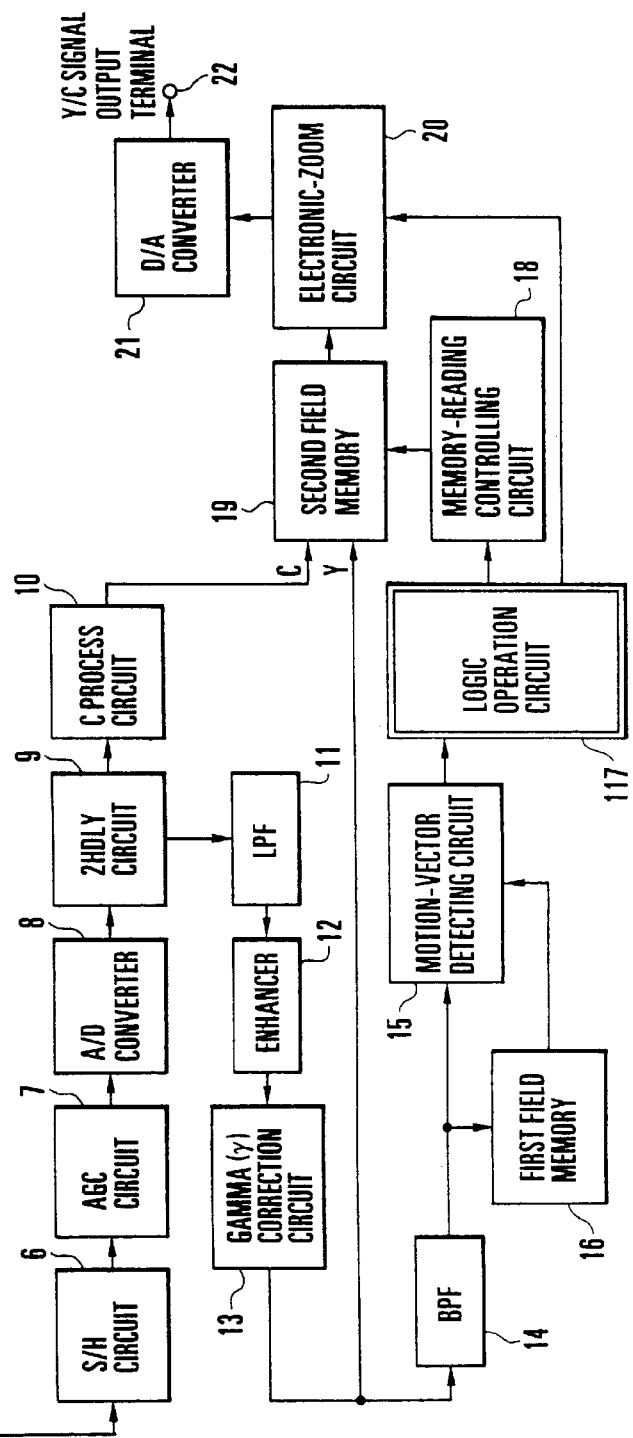
FIG. 14

F I G. 16
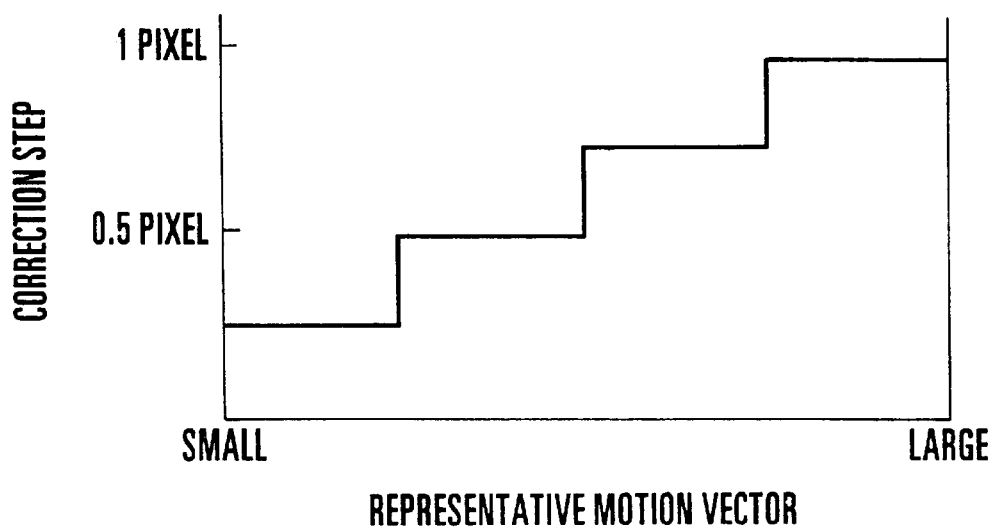
REPRESENTATIVE MOTION VECTOR
F I G. 17
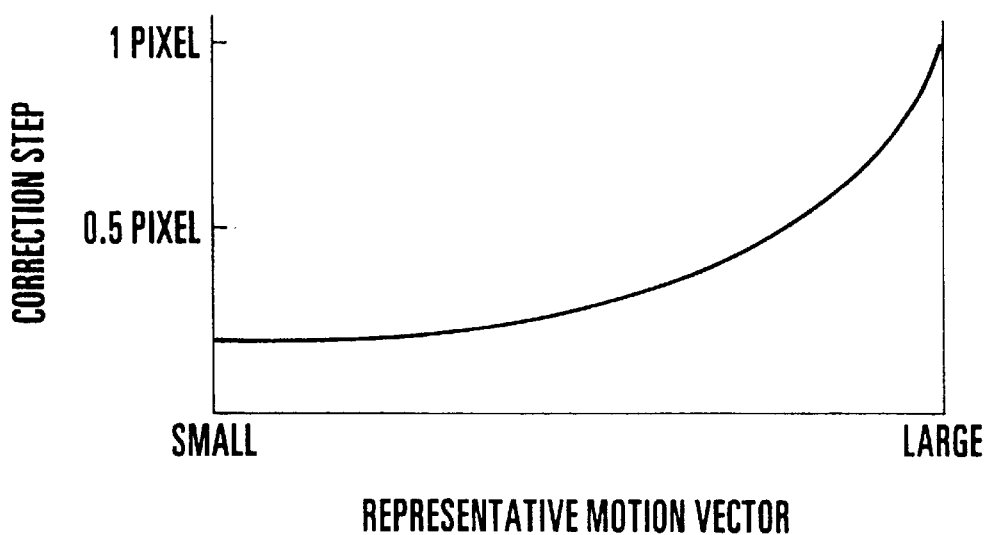
REPRESENTATIVE MOTION VECTOR

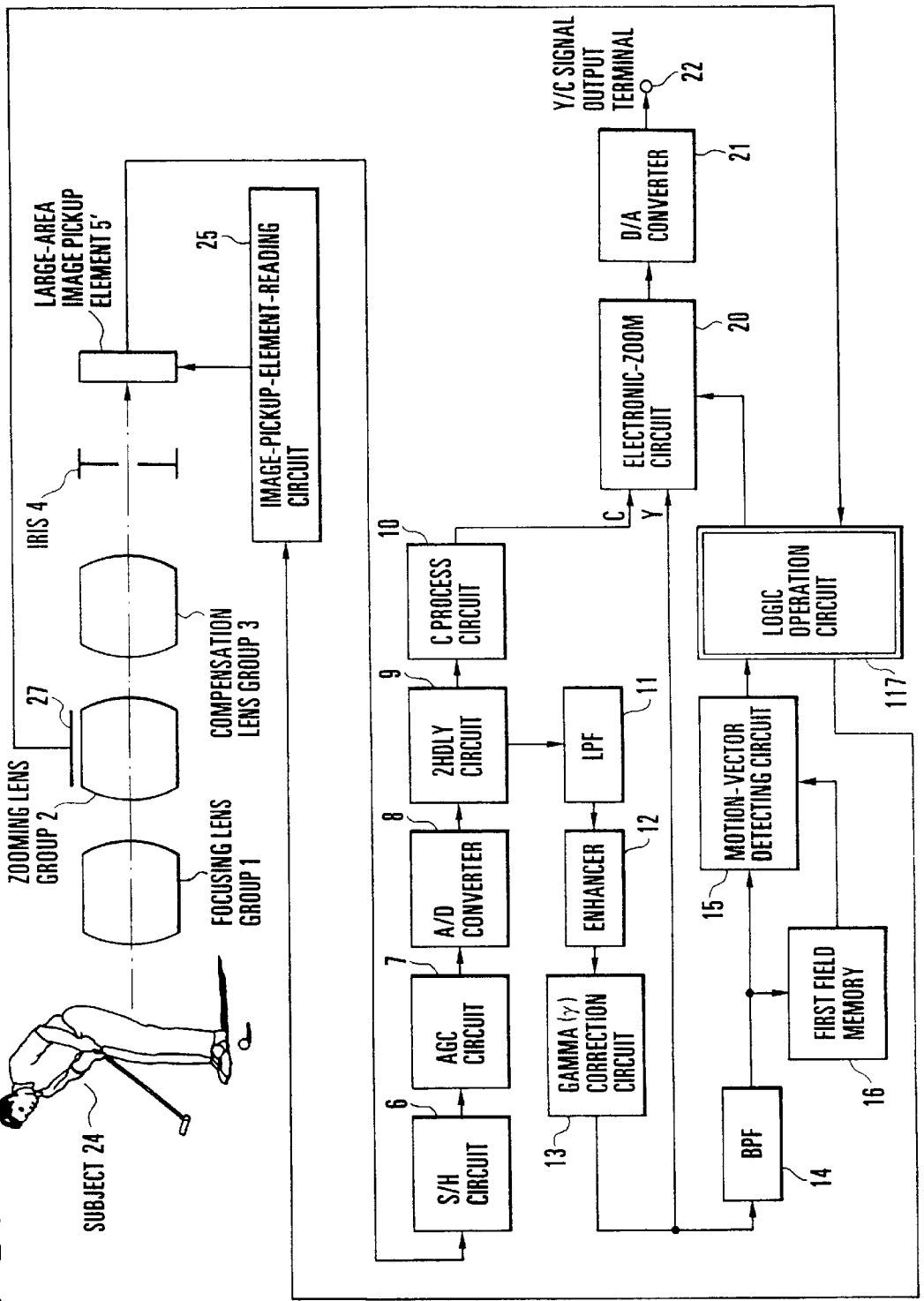

ELECTRONIC IMAGE-MOVEMENT CORRECTING DEVICE WITH A VARIABLE CORRECTION STEP FEATURE

This application is a division of application Ser. No. 08/904,455, filed Aug. 1, 1997, now U.S. Pat. No. 5,825,415.

BACKGROUND OF THE INVENTION

1. Field of the Invention

The present invention relates to an image-shake correcting device for preventing an image picked up by an image pickup apparatus from being shaken by a vibration of a hand or the like and, more particularly, to an image-shake correcting device suitable for use in an image pickup apparatus, such as a portable video camera.

2. Description of the Related Art

It is known that, in an image pickup apparatus such as a video camera, whether the industrial or domestic type, a vibration of the camera visually impairs an image and causes various kinds of malfunctions. It is also known that an image shake easily occurs particularly when photography is performed during walking, in a vehicle which is running, or in a place which vibrates to a significant extent. For these reasons, to correct such an image shake, it has heretofore been proposed to provide various types of image-shake correcting devices which will be described below.

For example, an inertial pendulum type of image-shake correcting device (U.S. Pat. Nos. 2,959,088 and 2,829,557 and the like) is known. In the inertial pendulum type of image-shake preventing device, an inertial pendulum type of shake preventing lens having a two-axes gimbal structure is disposed around a master lens, and an image shake is cancelled by this shake preventing lens, thereby correcting the image shake. Another example is a variable-angle-prism type of image-shake correcting device in which a variable angle prism for varying the optical axis of a lens (front lens) is disposed in front of the lens, and which is arranged to detect a movement from an image signal outputted from an image pickup element (CCD) or to detect a movement by means of an acceleration sensor, and drive the variable angle prism on the basis of the resultant detection signal, thereby correcting an image shake. Yet another example is a purely electronic image-shake correcting device which is arranged to store a video signal outputted from an image pickup element (CCD) in an image memory or the like, detect an image shake from information about the video signal to find the amount of displacement of the image, and shift an image reading address of the image memory according to the amount of displacement of the image, thereby correcting the image shake (Japanese Laid-Open Patent Application No. Sho 63-166370).

The third one of the above-described examples, i.e., the purely electronic image-shake correcting device, has recently received attention. This is because the purely electronic image-shake correcting device does not need any special mechanical mechanism for correcting an image shake and can be reduced in size, weight and cost owing to the rapid advance of semiconductor technology which makes it possible to accommodate a large-scale electrical circuit into an extremely small package.

However, the above-described purely electronic image-shake correcting device has a number of problems. For example, if an electronically enlarged image is corrected by moving (shifting) the electronically enlarged image with a correction step of not greater than the minimum pixel of the image pickup element, a moiré noise which leads to an image degradation may be caused by a movement of a position at which a resolution degradation occurs due to image enlargement processing, although the degree of the moiré noise depends on an image enlargement ratio and the kind of image. If an image is not electronically enlarged and is merely moved with the correction step of not greater than the minimum pixel of the image pickup element, a resolution degradation still occurs and a large image degradation occurs due to image-shake correction.

SUMMARY OF THE INVENTION

A first object of the present invention which has been made in light of the above-described problems is to provide an electronic image-shake correcting device which causes no large image degradation.

A second object of the present invention is to provide an image-shake correcting device capable of minimizing a resolution degradation and a moiré noise due to a movement of the position of occurrence of the resolution degradation, thereby minimizing an image degradation due to image-shake correction.

To achieve the above-described objects, according to one aspect of the present invention, there is provided an image pickup apparatus which comprises motion-vector detecting means for detecting a motion vector relative to images, electronic correcting means for electronically correcting an image shake on the basis of the motion vector detected by the motion-vector detecting means, image enlarging means for performing image enlargement processing on a picked-up image signal whose image shake is corrected by the electronic correcting means, image-enlargement-ratio varying means for varying an image enlargement ratio of the image enlarging means, and control means for controlling a correction step of the electronic correcting means in accordance with the image enlargement ratio set by the image-enlargement-ratio varying means to set the correction step to an optimum state.

To achieve the above-described objects, according to another aspect of the present invention, there is provided an image pickup apparatus which comprises image pickup means, motion-vector detecting means for detecting a motion vector relative to images, absolute-deviation computing means for computing an absolute deviation from a reference point of a current image on the basis of the motion vector detected by the motion-vector detecting means, electronic correcting means for electronically correcting an image shake on the basis of the absolute deviation computed by the absolute-deviation computing means, detecting means for detecting whether the image pickup means is fixed, and control means for controlling a correction step of the electronic correcting means on the basis of a detection signal provided by the detecting means to set the correction step to an optimum state.

To achieve the above-described objects, according to yet another aspect of the present invention, there is provided an image pickup apparatus which comprises motion-vector detecting means for detecting a motion vector relative to images, absolute-deviation computing means for computing an absolute deviation from a reference point of a current image on the basis of the motion vector detected by the motion-vector detecting means, electronic correcting means for electronically correcting an image shake on the basis of the absolute deviation computed by the absolute-deviation computing means, zoom magnification detecting means for detecting a zoom magnification, and control means for controlling a correction step of the electronic correcting means according to the zoom magnification detected by the zoom magnification detecting means to set the correction step to an optimum state.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 1 is a block diagram showing the arrangement of a video camera which is an image pickup apparatus provided with an image-shake correcting device according to a first embodiment of the present invention;

FIG. 5 is a block diagram showing the arrangement of a video camera which is an image pickup apparatus provided with an image-shake correcting device according to a third embodiment of the present invention;

FIG. 14 is a block diagram showing the arrangement of a video camera which is an image pickup apparatus provided with an image-shake correcting device according to an eighth embodiment of the present invention;

FIG. 16 is a view showing one example of setting of a correction step with respect to a -representative motion vector in the image-shake correcting device shown in FIG. 14;

FIG. 17 is a view showing one example of setting of a correction step with respect to a representative motion vector in an image-shake correcting device according to a ninth embodiment of the present invention;

FIG. 21 is a block diagram showing the arrangement of a video camera which is an image pickup apparatus provided with an image-shake correcting device according to a twelfth embodiment of the present invention.

DETAILED DESCRIPTION OF THE PREFERRED EMBODIMENTS

Embodiments of the present invention will be described below in detail with reference to the accompanying drawings.

(First Embodiment)

Figure 2:
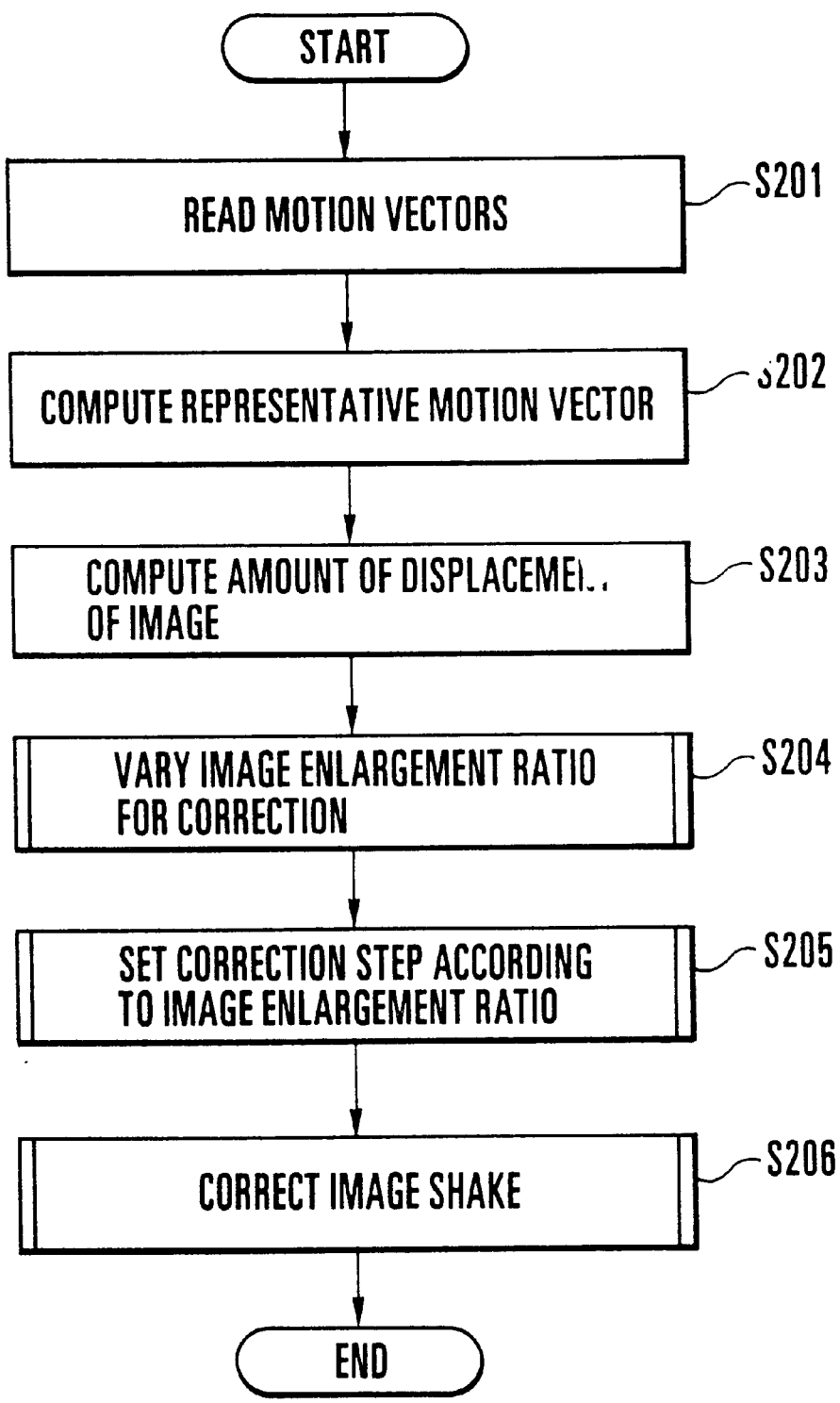
FIG. 2 is a flowchart showing the control operation of a logic operation circuit provided in the image-shake correcting device shown in FIG. 1.

A first embodiment of the present invention will be described below with reference to FIGS. 1 through 3. FIG. 1 is a block diagram showing the arrangement of a video camera provided with an image-shake correcting device according to the first embodiment of the present invention.

The arrangement shown in FIG. 1 includes a focusing lens group 1 provided for the purpose of focusing, a zooming lens group 2 for optically varying a magnification by varying a focal length, a compensation lens group 3 for compensating for a variation of an in-focus position due to a movement of the zooming lens group 2, an iris 4 for adjusting the amount of incident light, an image pickup element 5 made up of, for example, a two-dimensional CCD provided for converting a light signal inputted through the lens groups 1 to 3 and the iris 4 into an electrical signal and outputting the electrical signal as a picked-up image signal, a sample-and-hold (S/H) circuit 6 for sampling and holding each pixel of the electrical signal outputted from the image pickup element 5, and an automatic gain control (AGC) circuit 7 for automatically controlling the gain of the electrical signal outputted from the S/H circuit 6.

The arrangement shown in FIG. 1 also includes an analog-to-digital (A/D) converter 8 for converting an analog signal outputted from the AGC circuit 7 into a digital signal, a delay (2HDLY) circuit 9 for receiving the output signal of the A/D converter 8 and delaying a color-difference line-sequential signal outputted from the image pickup element 5 by two horizontal scanning periods (2H), a chrominance signal generating (C process) circuit 10 for receiving the output signal of the 2HDLY circuit 9 and generating a chrominance (C) signal, a low-pass filter (LPF) 11 for receiving the output signal of the 2HDLY circuit 9 and eliminating a chrominance signal C contained in a luminance signal Y, and an enhancer 12 for receiving the output signal of the LPF 11 and enhancing a high-frequency component.

The arrangement shown in FIG. 1 also includes a gamma (γ) correction circuit 13 for receiving the output signal of the enhancer 12 and performing gamma correction thereof, a two-dimensional band-pass filter (BPF) 14 which is a spatial frequency filter for receiving the output signal of the gamma correction circuit 13 and eliminating a signal having a predetermined frequency band from the received signal, and a motion-vector detecting circuit 15 for receiving both the output signal of the BPF 14 and the output signal of a first field memory 16 which indicates an image immediately previous to the current image and detecting a motion vector of an image on the basis of a correlation between both images. The first field memory 16 will be described later. The motion-vector detecting circuit 15 is a circuit which is based on a matching computation, and, in the first embodiment, it is preferable that the motion-vector detecting circuit 15 adopt a detection method which can execute real-time processing. The first field memory 16 is arranged to receive the output signal of the BPF 14. The first field memory 16 serves as a delay circuit for delaying the luminance signal Y by a predetermined time (in the first embodiment, a one-field period), and is arranged to store the luminance signal Y contained in a field which immediately precedes the current field, thereby enabling a matching computation on the previous and current fields.

A logic operation circuit 17 controls the entire image pickup apparatus by performing predetermined kinds of signal processing, and is formed by a microcomputer. The logic operation circuit 17 receives the output signal of the motion-vector detecting circuit 15 and the output signal of an image-enlargement-ratio input switch (image-enlargement-ratio varying means) 23 which will be described later. The logic operation circuit 17 used in the first embodiment has the image-enlargement-ratio varying means for varying an image enlargement ratio on the basis of the output signal of the image-enlargement-ratio input switch 23.

A memory-reading controlling circuit 18 used in the first embodiment is arranged to control the image reading position and area of a second field memory 19 (which will be described later) on the basis of a control signal outputted from the logic operation circuit 17. The memory-reading controlling circuit 18 constitutes electronic correcting means for correcting an image shake by shifting the image reading position of the second field memory 19 in the direction of a movement of an image and cancelling the movement of the image. The second field memory 19 receives the chrominance signal C outputted from the C process circuit 10 and the luminance signal Y outputted from the gamma correction circuit 13. In the second field memory 19, the movement of the image is corrected for both the chrominance signal C and the luminance signal Y.

An electronic-zoom circuit 20 receives the output signals of the second field memory 19 and the logic operation circuit 17 and converts the image read from the second field memory 19 into an image of desired size. Specifically, the electronic-zoom circuit 20 varies an image reading rate and performs interpolation to electronically enlarge the image. A digital/analog (D/A) converter 21 is provided for converting a digital signal outputted from the electronic-zoom circuit 20 to an analog signal. The corrected image signal, which is outputted from the electronic-zoom circuit 20, is outputted through a signal output terminal 22. The image-enlargement-ratio input switch 23 is provided for inputting an image enlargement ratio for use in the electronic-zoom circuit 20, and the output signal of the image-enlargement-ratio input switch 23 is inputted to the logic operation circuit 17.

The operation of the image pickup apparatus having the above-described arrangement will be described below.

An image of a subject 24 sequentially passes through the lens groups 1 to 3 and the iris 4 and is formed on an image pickup surface of the image pickup element 5. The formed image of the subject 24 is photoelectrically converted by the image pickup element 5. The S/H circuit 6 holds the output signal of the image pickup element 5, and the AGC circuit 7 executes automatic gain control. The A/D converter 8 performs A/D conversion of the output signal of the AGC circuit 7. The 2HDLY circuit 9 separates the color-difference line-sequential signal outputted from the image pickup element 5 into a 1H delayed signal and a 2H delayed signal, and sends the respective 1H and 2H delayed signals to a luminance signal processing part (which includes the LPF 11 and so on) and a chrominance signal processing part (which includes the C process circuit 10 and so on). The 2H delayed signal sent to the chrominance signal processing part is inputted to the C process circuit 10, and the C process circuit 10 generates the chrominance signal C and writes the chrominance signal C into the second field memory 19.

In the meantime, the 1H delayed signal sent to the luminance signal processing part is inputted to the LPF 11, and the LPF 11 eliminates a carrier component from the color-difference line-sequential signal to perform separation of the luminance-signal Y. The enhancer 12 performs the processing of enhancing the high-frequency component of the luminance signal Y, such as the edge of the image of the subject 24, for the purpose of improving image quality. Normally, in such processing, a quadratic differential of the video signal (luminance signal Y) is added to the original luminance signal Y. Then, the gamma correction circuit 13 executes the processing of preventing saturation of the high-light portion of the luminance signal Y and expanding the dynamic range thereof. The BPF 14 extracts a spatial frequency component which is useful for detecting a motion vector.

Since the high- and low-frequency components of an image signal are generally unsuitable for detecting a motion vector, they are eliminated by the BPF 14. In the first embodiment, only a sign bit is outputted from the BPF 14. This means that the luminance signal Y is converted into a two-level signal by using a DC level as a threshold. Accordingly, the luminance signal Y which has passed through the BPF 14 is a two-level signal represented by one bit.

The motion-vector detecting circuit 15 detects a motion vector of the image on the basis of the signals inputted from the BPF 14 and the first field memory 16, and inputs the detected motion vector signal to the logic operation circuit 17. Also, an enlargement-ratio signal indicative of an image enlargement ratio to be used during image-shake correction is inputted from the image-enlargement-ratio input switch 23 to the logic operation circuit 17. The logic operation circuit 17 calculates a deviation from a reference position of the image at that time instant in accordance with the flow-chart shown in FIG. 2 which will be described later, on the basis of the motion vector signal (the horizontal and vertical components of a motion vector at a predetermined position in the picture). Then, the memory-reading controlling circuit 18 controls the image reading position of the second field memory 19 with a correction step according to the image enlargement ratio, and the image outputted from the second field memory 19 is converted into an image of desired size by the electronic-zoom circuit 20. In this manner, the image whose image shake is finally corrected is obtained. The corrected image signal is D/A converted by the D/A converter 21, and the analog signal is outputted through the signal output terminal 22.

The operation of the logic operation circuit 17 provided in the image-shake correcting device according to the first embodiment will be described below with reference to FIGS. 1 and 2. FIG. 2 is a flowchart showing the operation of the logic operation circuit 17. In Step S201, the logic operation circuit 17 reads the output signal of the motion-vector detecting circuit 15 (the horizontal and vertical components of a motion vector at a predetermined position in a picture) on field-by-field basis. Then, the process proceeds to Step S202, in which the logic operation circuit 17 detects movement of an image in the read plurality of pictures at a plurality of positions per picture and performs predetermined processing on motion vectors at the plurality of positions, thereby computing one representative motion vector. The predetermined processing includes the process of performing averaging, such as the process of evaluating the reliability of each of the motion vectors or the processing of determining a target area to be controlled.

Then, the process proceeds to Step S203, in which the logic operation circuit 17 integrates the representative motion vector to find a deviation from a reference position in the picture (the amount of displacement of the image), thereby producing an image-shake correction signal. Then, the process proceeds to Step S204, in which the logic operation circuit 17 reads an enlargement-ratio signal outputted from the image-enlargement-ratio input switch 23 and controls the electronic-zoom circuit 20 so that a desired enlargement ratio can be obtained. Then, the process proceeds to Step S205, in which the logic operation circuit 17 sets the correction step of the memory-reading controlling circuit 18 to an optimum state on the basis of the image enlargement ratio set in Step S204. Then, the process proceeds to Step S206, in which the image shake is corrected by moving the image reading position of the second field memory 19 with the image enlargement ratio set in Step S204 and the correction step set in Step S205. After that, the logic operation circuit 17 brings the process to an end.

The processing routines of Step S204 and Step S205, which constitute part of the gist of the present invention, will be described in more detail with reference to FIGS. 1 and 3.

Figure 3:
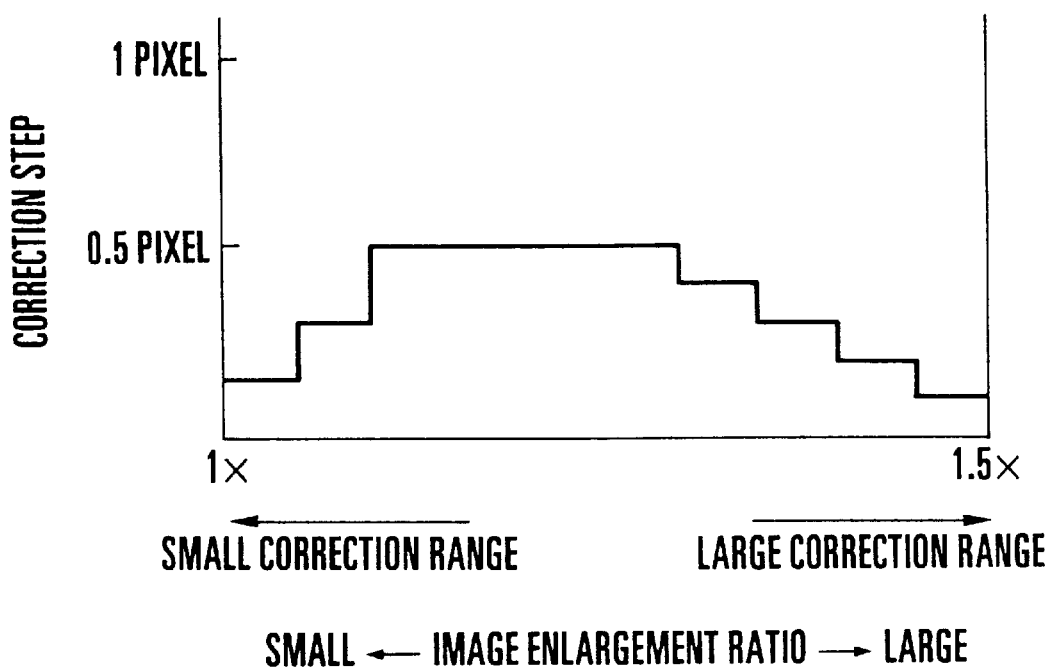
FIG. 3 is a view showing one example of setting of a correction step with respect to a variation of an image enlargement ratio in the image-shake correcting device shown in FIG. 1.

FIG. 3 is a view showing one example of setting of the correction step with respect to a variation of the image enlargement ratio. In FIG. 3, the vertical and horizontal axes represent the correction step and the image enlargement ratio, respectively. In FIG. 3, normally, the correction step is set according to the accuracy of detection of an image shake. The image enlargement ratio indicates an image enlargement ratio for image-shake correction, which is arbitrarily inputted through the image-enlargement-ratio input switch 23 by a photographer and is set in Step S204 of FIG. 2.

In general, as the image enlargement ratio is made larger, a correction range becomes wider and the frequency of occurrence of a resolution degradation becomes higher. Specifically, if the image enlargement ratio is made larger, an image reading area of a memory can be made smaller, so that it is possible to enlarge the amount by which the image reading area can be shifted on the memory. In consequence, the amount of shake correction becomes large, but since pixel information is lost, a resolution degradation becomes large. Contrarily, as the image enlargement ratio is made smaller, the correction range becomes narrower and the frequency of occurrence of a resolution degradation becomes lower. Accordingly, if, for example, a photographer determines that there is no large image shake or desires to avoid a degradation in resolution, the photographer may set the image enlargement ratio to a small value. If, for example, the photographer determines that there is a large image shake, the photographer intentionally sets the image enlargement ratio to a large value, whereby it is possible to correct an image shake which is normally impossible to correct.

However, it has been found out that as the correction step is made smaller, a movement of a position at which a resolution degradation occurs due to image enlargement processing becomes more noticeable. The extent of this movement greatly varies with the image enlargement ratio, and most greatly varies at an image enlargement ratio of approximately 1.1× in terms of visual characteristics. If the image enlargement ratio is smaller or larger than approximately 1.1×, the resolution degradation becomes unnoticeable. For this reason, as shown in FIG. 3, if the correction step is set to a value at which the resolution degradation is most unnoticeable, according to the image enlargement ratio set by the photographer, a satisfactory image can be obtained under any photographic condition. Accordingly, in the example shown in FIG. 3, the correction step is made large at the image enlargement ratio of approximately 1.1× at which the resolution degradation is most noticeable, whereas the correction step is made small in a zone of image enlargement ratio lower than approximately 1.1× as well as a zone of image enlargement ratio higher than approximately 1.1×.

According to the first embodiment, there is provided an image-shake correcting device capable of electronically correcting an image shake, which allows a photographer to arbitrarily vary an image enlargement ratio to be used during image-shake correction, under various photographic conditions. In addition, in the image-shake correcting device, since the correction step with which an image shake is corrected can be set to an optimum state according to the image enlargement ratio, it is possible to minimize a resolution degradation and noise due to a movement of the position of occurrence of the resolution degradation. Accordingly, it is possible to achieve the advantage of minimizing an image degradation due to image-shake correction.

(Second Embodiment)

A second embodiment of the present invention will be described below with reference to FIG. 4.

Figure 4:
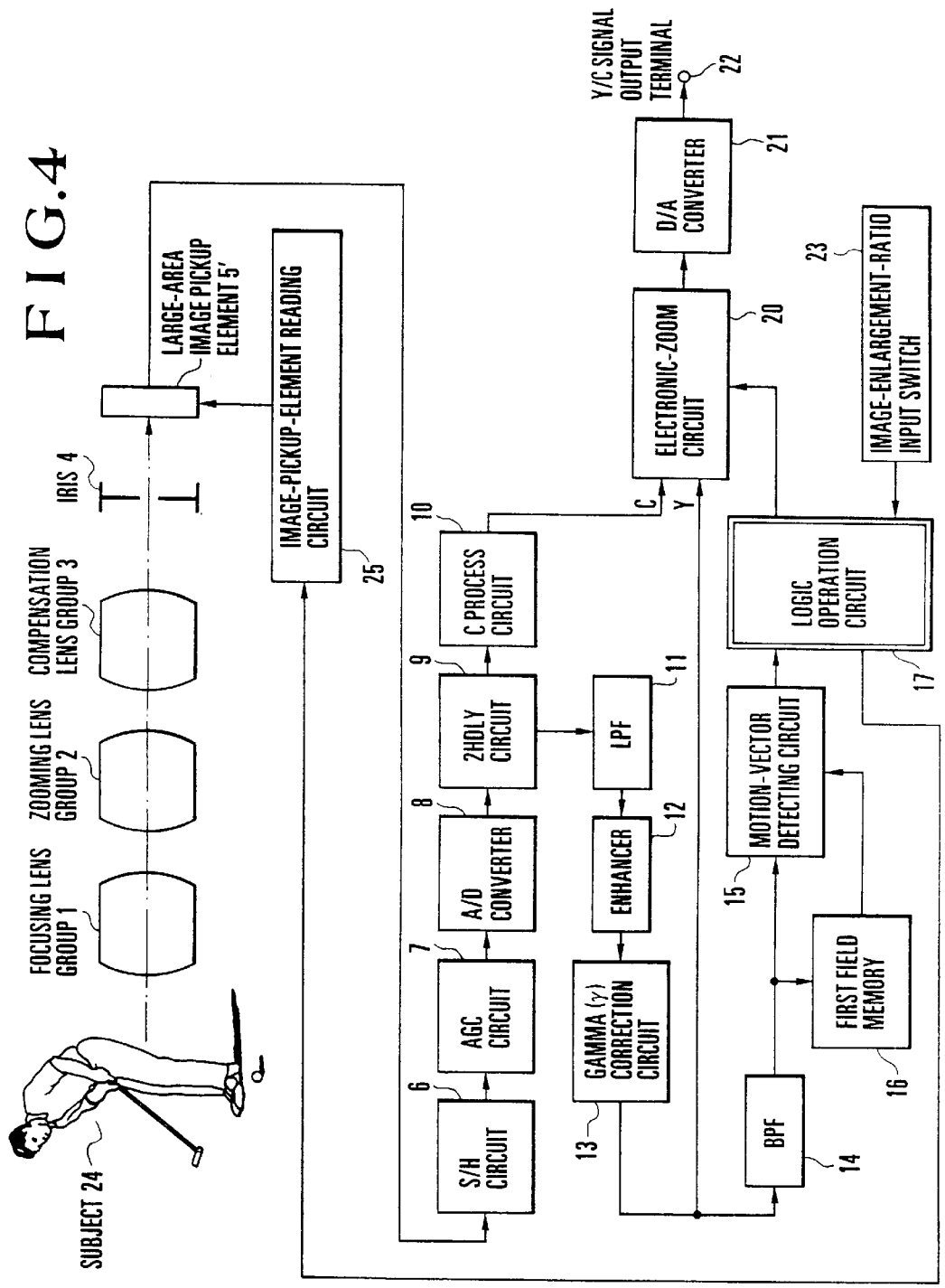
FIG. 4 is a block diagram showing the arrangement of a video camera which is an image pickup apparatus provided with an image-shake correcting device according to a second embodiment of the present invention.

FIG. 4 is a block diagram showing the arrangement of a video camera provided with an image-shake correcting device according to the second embodiment of the present invention. In FIG. 4, identical reference numerals are used to denote constituent parts identical to those used in the above-described first embodiment. The arrangement shown in FIG. 4 differs from that shown in FIG. 1 in that the image pickup element 5, the memory-reading controlling circuit 18 and the second field memory 19 are omitted from the arrangement shown in FIG. 4 and, instead, a large-area image pickup element 5', having a larger area than a normal image pickup element, and an image-pickup-element reading circuit 25 are provided. The large-area image pickup element 5' and the image-pickup-element reading circuit 25 constitute correcting means which has a feedback loop and serves to correct an image shake. The image-pickup-element reading circuit 25 varies the reading address of the large-area image pickup element 5' to cut out an image from an arbitrary area of the large-area image pickup element 5' and shift the position of the cut-out image, thereby effecting image-shake correction.

The other arrangement, operation, effects and advantages of the second embodiment are substantially identical to those of the first embodiment described previously, and description thereof is omitted.

(Third Embodiment)

Figure 6:
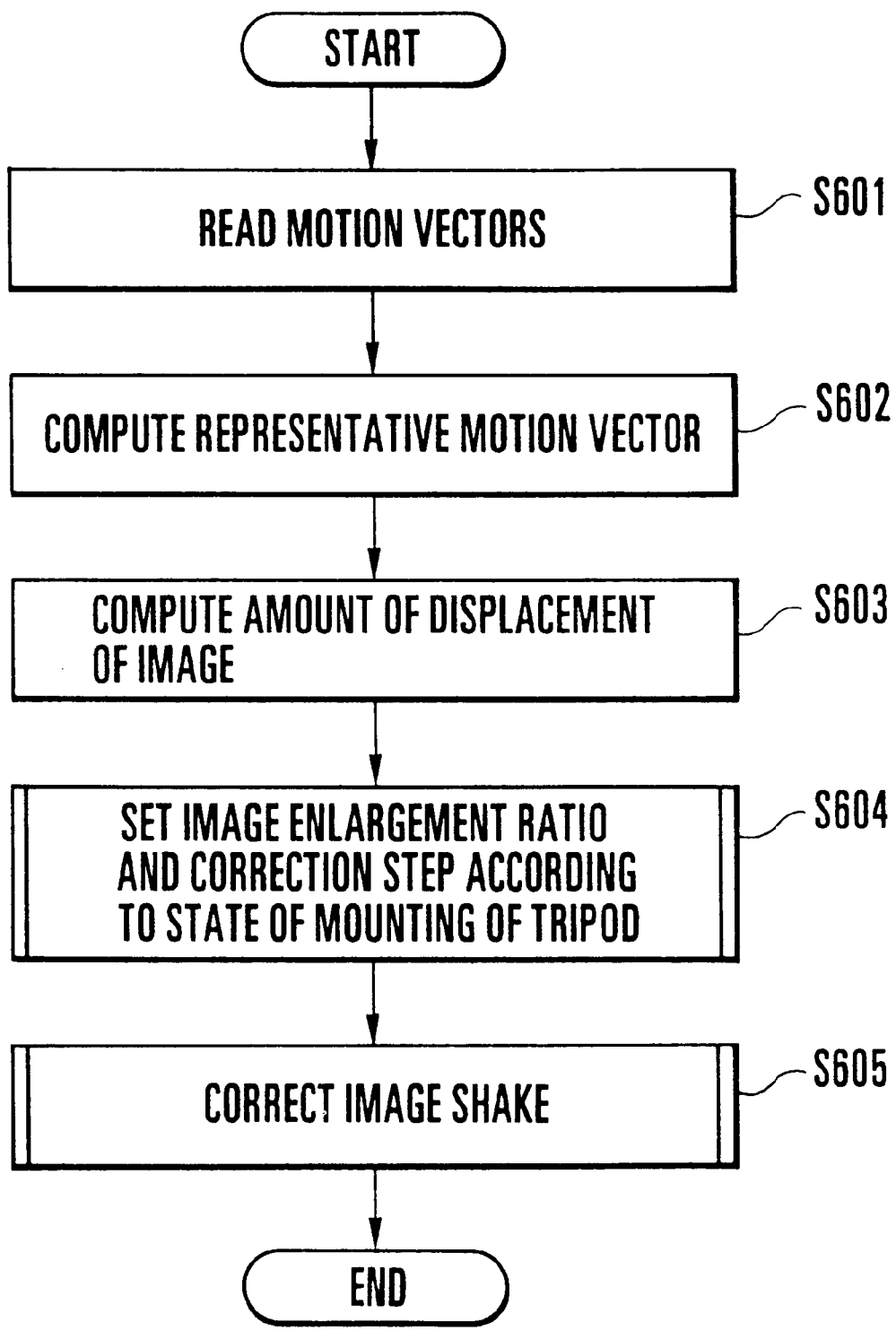
FIG. 6 is a flowchart showing the control operation of a logic operation circuit provided in the image-shake correcting device shown in FIG. 5.
Figure 7:
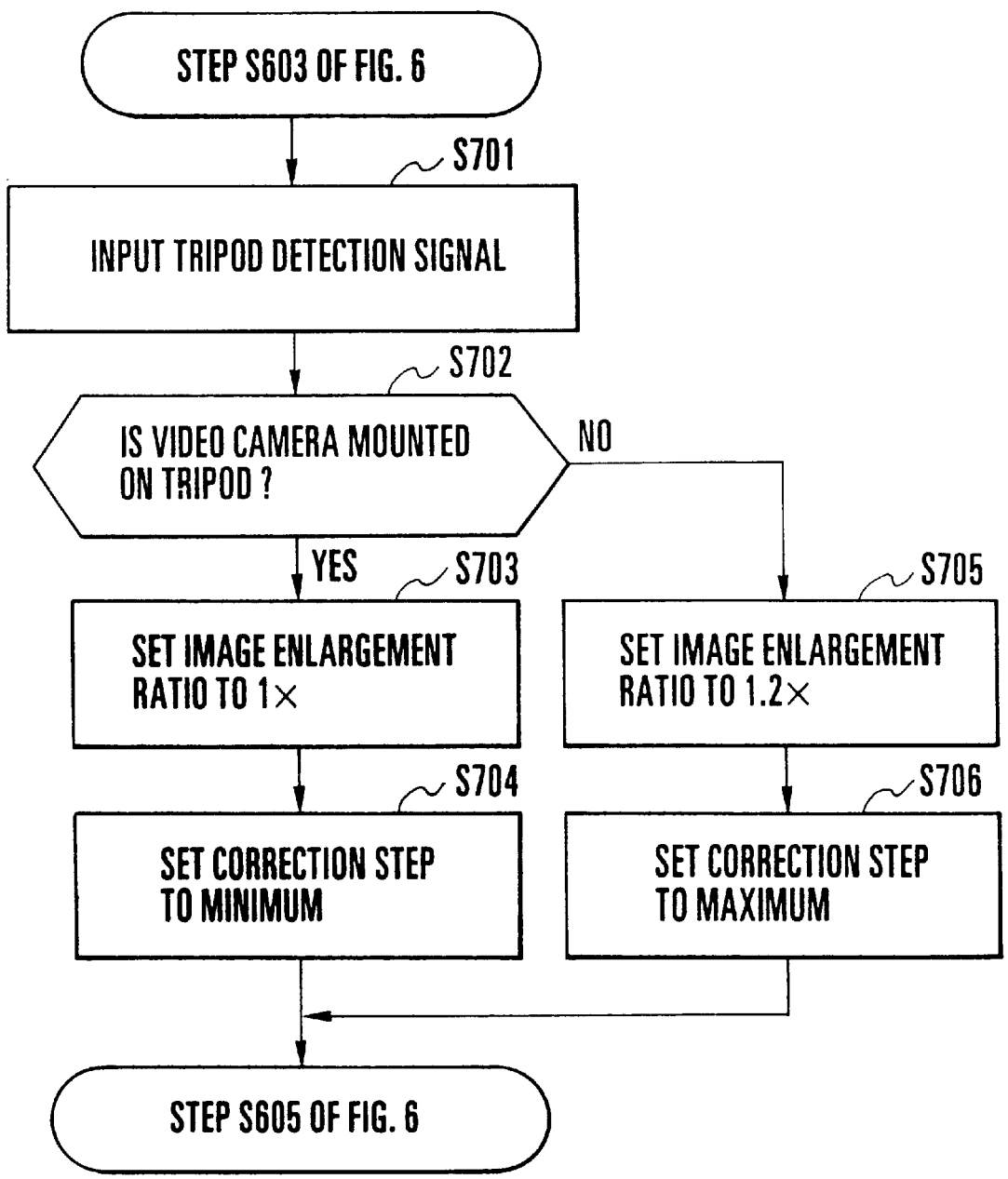
FIG. 7 is a flowchart showing in detail the essential processing operation of the logic operation circuit provided in the image-shake correcting device according to the third embodiment.

The third embodiment of the present invention will be described below with reference to FIGS. 5 through 7. FIG. 5 is a block diagram showing the arrangement of a video camera provided with an image-shake correcting device according to the third embodiment of the present invention. In FIG. 5, identical reference numerals are used to denote constituent parts identical to those used in the first embodiment described above with reference to FIG. 1. The arrangement shown in FIG. 5 differs from that shown in FIG. 1 in that the image-enlargement-ratio input switch 23 is omitted from the arrangement shown in FIG. 1 and, instead, a tripod-mounting detection signal generating circuit 26 for generating a tripod-mounting detection signal indicating that the video camera is supported on a supporting stand (tripod) is added to the arrangement shown in FIG. 1. The tripod-mounting detection signal generating circuit 26 includes constituent elements (not shown), such as a switch for generating a detection signal when a mounting screw of a tripod is screwed into a threaded hole formed in a tripod mounting portion of the video camera. In the third embodiment, the logic operation circuit 17 constitutes support detecting means for detecting whether the video camera is supported on the tripod on the basis of the tripod-mounting detection signal generated by the tripod-mounting detection signal generating circuit 26.

The construction and operation of the other portion of the third embodiment are substantially identical to the construction and operation of the first embodiment described previously, and description thereof is omitted.

The operation of the logic operation circuit 17 provided in the image-shake correcting device according to the third embodiment will be described below with reference to FIGS. 5 and 6. FIG. 6 is a flowchart showing the operation of the logic operation circuit 17. In Step S601, the logic operation circuit 17 reads the output signal of the motion-vector detecting circuit 15 (the horizontal and vertical components of a motion vector at a predetermined position in a picture) on field-by-field basis. Then, the process proceeds to Step S602, in which the logic operation circuit 17 performs predetermined processing on the read plurality of motion vectors at positions in a plurality of fields, thereby computing one representative motion vector. The predetermined process includes the processing of evaluating the reliability of each of the motion vectors, the process of determining a target area to be controlled, and the like.

Then, the process proceeds to Step S603, in which the logic operation circuit 17 integrates the representative motion vector to find a deviation from a reference position in the picture (the amount of displacement of the image), thereby producing an image-shake correction signal. Then, the process proceeds to Step S604, in which the logic operation circuit 17 reads a detection signal outputted from the tripod-mounting detection signal generating circuit 26 and sets both an image enlargement ratio and a correction step of the memory-reading controlling circuit 18 to their respective optimum states on the basis of the detection signal. Then, the process proceeds to Step S605, in which the image shake is corrected by moving the image on the basis of the image enlargement ratio and the correction step which have been set in Step S604. After that, the logic operation circuit 17 brings the process to an end.

The processing of Step S604 of FIG. 6, which constitutes part of the gist of the present invention, will. be described in more detail with reference to FIGS. 5 and 7. FIG. 7 is a flowchart showing the detail of the processing routine of Steps S604 and S605 of FIG. 6. In Step S701 of FIG. 7, the logic operation circuit 17 receives the detection signal outputted from the tripod-mounting detection signal generating circuit 26, and, in Step S702, determines whether the video camera is mounted on a tripod on the basis of the detection signal obtained in Step S701. If it is determined that the video camera is mounted on the tripod, the process proceeds to Step S703, in which the image enlargement ratio is set to 1×. Then, in Step S704, the correction step is set to a minimum. If it is not determined in Step S702 that the video camera is mounted on the tripod, the process proceeds to Step S705, in which the image enlargement ratio is set to 1.2×. Then, in Step S704, the correction step is set to a maximum.

In general, during photography with a video camera mounted on a tripod, since the amplitude of an image shake is small, it is possible to perform image-shake correction based on only field memory control which does not involve electronic enlargement processing using the electronic-zoom circuit 20. However, in this case, since an image is stable so that a movement of the image tends to be considerably noticeable during shifting thereof, the correcting step is made small so that the image can be smoothly moved. During photography with the video camera removed from the tripod, since the amplitude of an image shake is large, the electronic enlargement processing using the electronic-zoom circuit 20 is performed to assure a correction range, and the correction step is set large to make a movement of a position of occurrence of a resolution degradation as unnoticeable as possible.

As described above, according to the third embodiment, in an image-shake correcting device capable of electronically correcting an image shake, it is determined whether the video camera is mounted on the tripod, and an optimum image enlargement ratio and a correction step (shifting step) with which an image is moved are set on the basis of the decision result. Accordingly, it is possible to minimize a resolution degradation and a noise due to a movement of the position of occurrence of the resolution degradation, whereby it is possible to achieve the advantage of minimizing an image degradation due to image-shake correction.

(Fourth Embodiment)

A fourth embodiment of the present invention will be described below with reference to FIG. 8.

Figure 8:
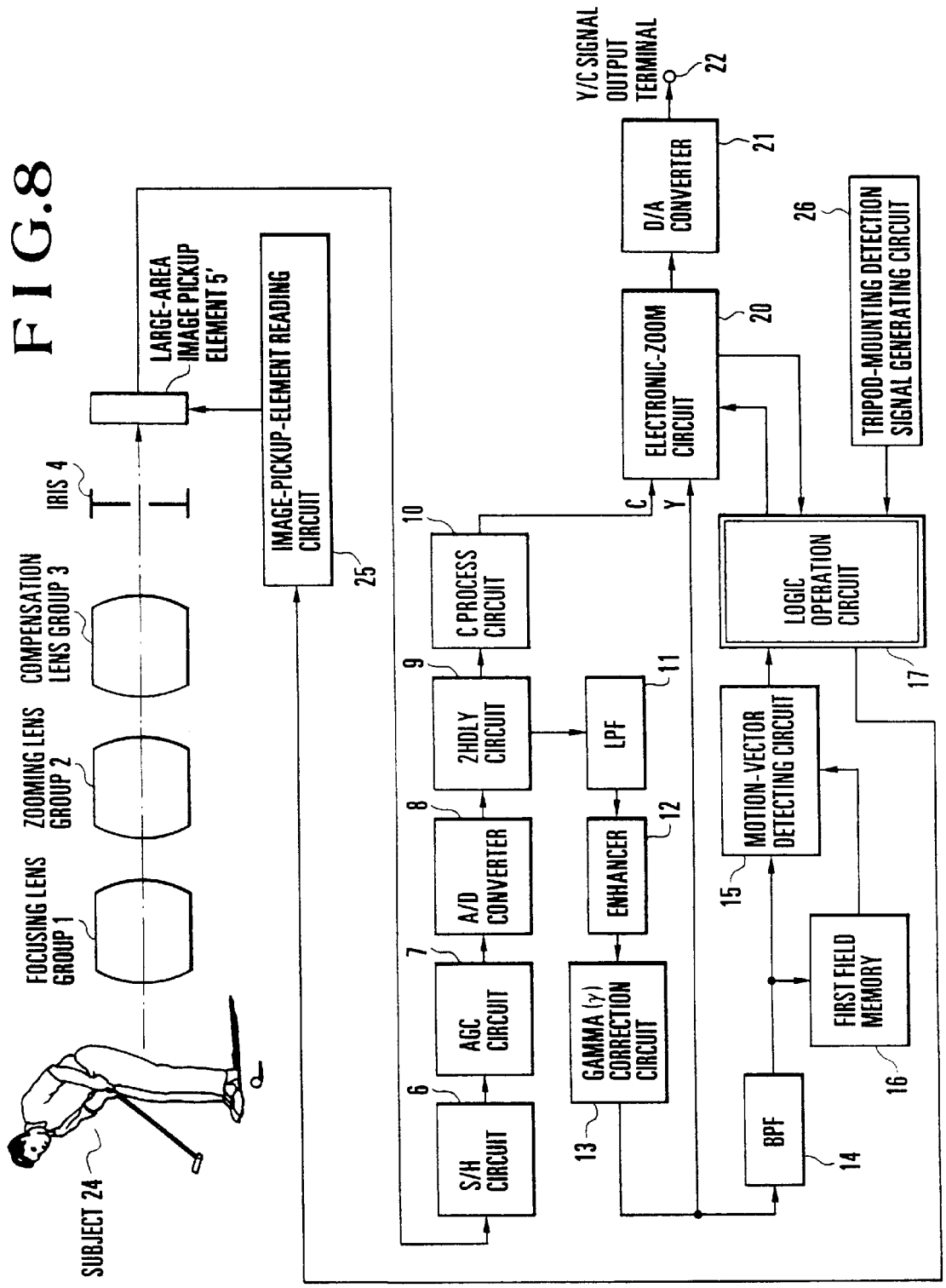
FIG. 8 is a block diagram showing the arrangement of a video camera which is an image pickup apparatus provided with an image-shake correcting device according to a fourth embodiment of the present invention.

FIG. 8 is a block diagram showing the arrangement of a video camera provided with an image-shake correcting device according to the fourth embodiment of the present invention. In FIG. 8, identical reference numerals are used to denote constituent parts identical to those used in the above-described third embodiment shown in FIG. 5. The arrangement shown in FIG. 8 differs from that shown in Figure in that the image pickup element 5, the memory-reading controlling circuit 18 and the second field memory 19 are omitted from the arrangement shown in FIG. 5 and, instead, a large-area image pickup element 5', having a larger area than a normal image pickup element, and an image-pickup-element reading circuit 25 are provided. The large-area image pickup element 5' and the image-pickup-element reading circuit 25 constitute first correcting means which has a feedback loop and serves to correct an image shake. The image-pickup-element reading circuit 25 varies the reading address of the large-area image pickup element 5' to cut out an image from an arbitrary area of the large-area image pickup element 5', thereby effecting image-shake correction.

The other arrangement, operation, effects and advantages of the fourth embodiment are substantially identical to those of the third embodiment described previously, and description thereof is omitted.

(Fifth Embodiment)

Each of the third and fourth embodiments is arranged in such a manner that when the mounting screw of a tripod is screwed into the threaded hole of the tripod mounting portion of the video camera, the tripod-mounting detection signal generating circuit 26 generates a detection signal which indicates that the video camera has been mounted on the tripod. However, the present invention is not limited to such an arrangement, and it is also possible to adopt, for example, an arrangement which determines whether the video camera is mounted on the tripod, from the state of distribution of motion vectors. In this arrangement, if, for example, the motion vectors continue to be not greater than a predetermined value as a whole for a predetermined time period, it is determined that the video camera has been mounted on the tripod.

(Sixth embodiment)

The sixth embodiment of the present invention will be described below with reference to FIGS. 9 through 12.

Figure 9:
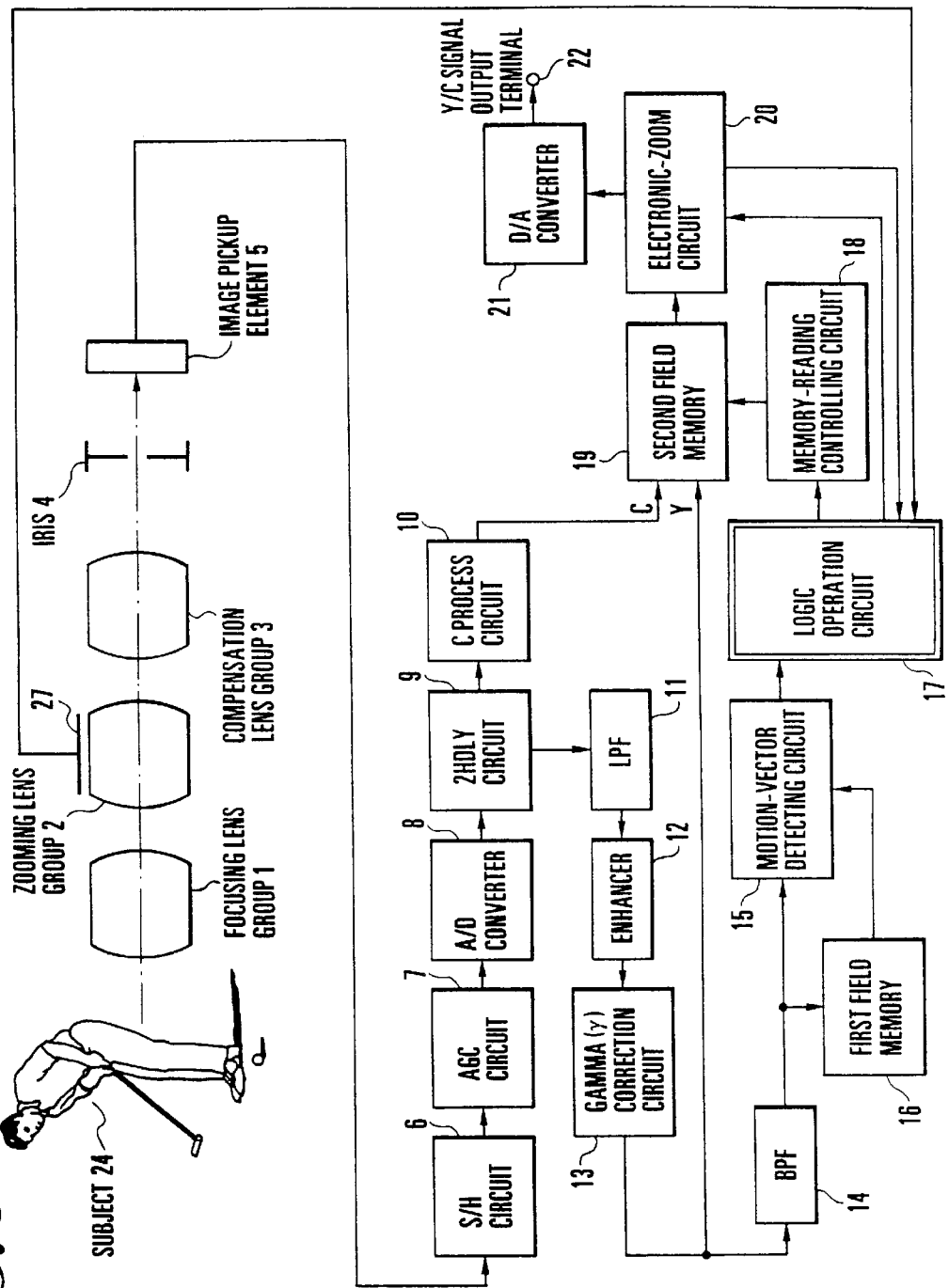
FIG. 9 is a block diagram showing the arrangement of a video camera which is an image pickup apparatus provided with an image-shake correcting device according to a sixth embodiment of the present invention.

FIG. 9 is a block diagram showing the arrangement of a video camera provided with an image-shake correcting device according to the sixth embodiment of the present invention. In FIG. 9, identical reference numerals are used to denote constituent parts identical to those used in the first embodiment described above with reference to FIG. 1. The arrangement shown in FIG. 9 differs from that shown in FIG. 1 in that the image-enlargement-ratio input switch 23 is omitted from the arrangement shown in FIG. 1 and, instead, a zoom encoder 27 for detecting the position of the zooming lens group 2 is provided. A position signal about the zooming lens group 2, which is detected by the zoom encoder 27, is inputted to the logic operation circuit 17. Incidentally, the other arrangement, operation, effects and advantages of the sixth embodiment are substantially identical to those of the first embodiment described previously, and description thereof is omitted.

Figure 10:
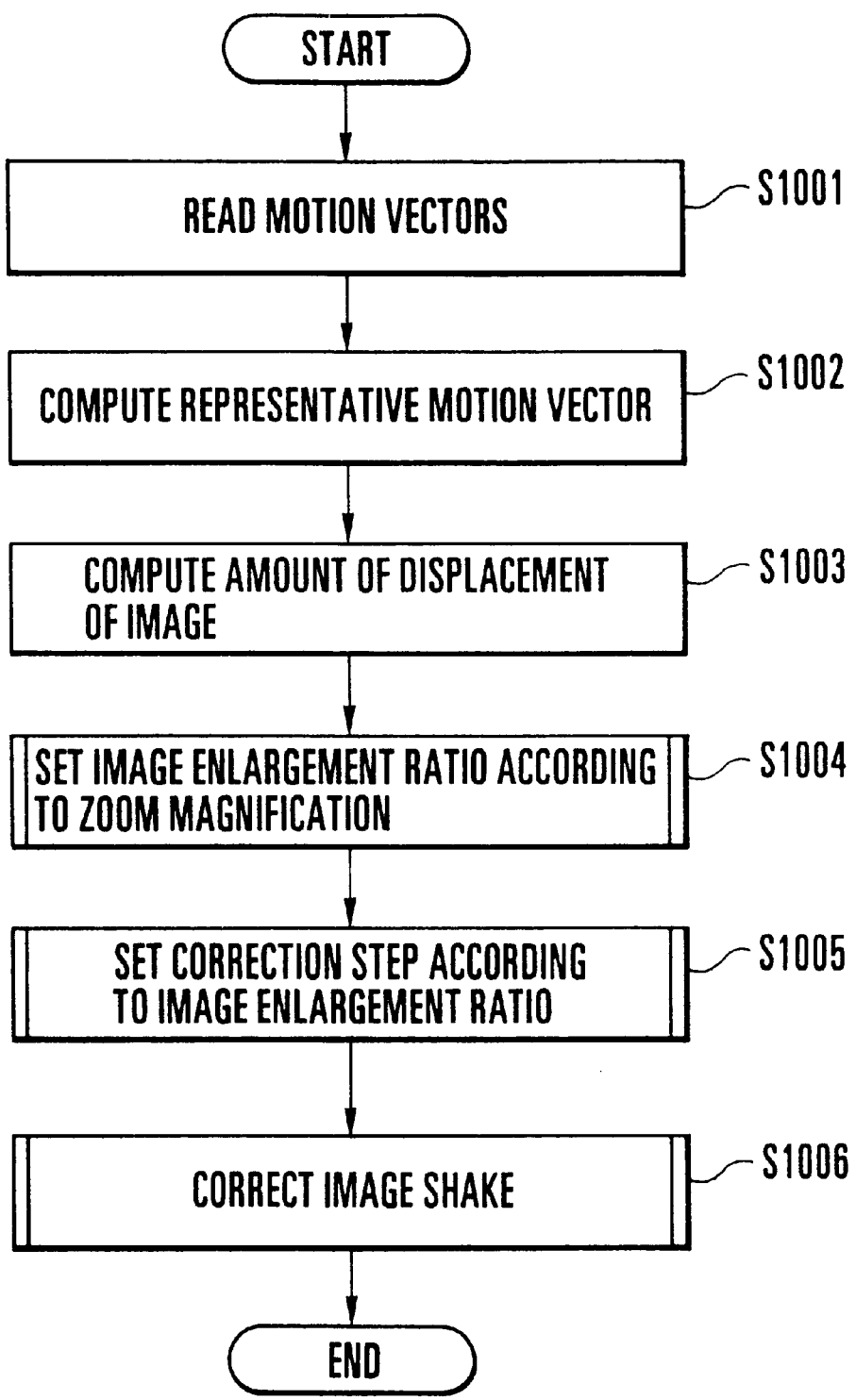
FIG. 10 is a flowchart showing the control operation of a logic operation circuit provided in the image-shake correcting device shown in FIG. 9.

The operation of the logic operation circuit 17 used in the image-shake correcting device according to the sixth embodiment will be described below with reference to FIGS. 9 and 10. FIG. 10 is a flowchart showing the operation of the logic operation circuit 17. In Step S1001, the logic operation circuit 17 reads the output signal of the motion-vector detecting circuit 15 (the horizontal and vertical components of a motion vector at a predetermined position in a picture) on field-by-field basis. Then, the process proceeds to Step S1002, in which the logic operation circuit 17 performs predetermined processing on the read plurality of motion vectors at positions in a plurality of fields, thereby computing one representative motion vector. The predetermined process includes the processing of evaluating the reliability of each of the motion vectors, the process of determining a target area to be controlled, and the like.

Then, the process proceeds to Step S1003, in which the logic operation circuit 17 integrates the representative motion vector to find a deviation from a reference position in the picture (the amount of displacement-of the image), thereby producing an image-shake correction signal. Then, the process proceeds to Step S1004, in which the logic operation circuit 17 sets an optimum image enlargement ratio for image-shake correction on the basis of a focal-length signal about an optical system which is outputted from the zoom encoder 27 and an electronic-zoom magnification signal which is outputted from the electronic-zoom circuit 20. Then, the process proceeds to Step S1005, in which the correction step of the memory-reading controlling circuit 18 is set to an optimum state according to the image enlargement ratio set in Step S1004. Then, the process proceeds to Step S1005, in which the image shake is corrected by moving the image on the basis of the image enlargement ratio set in Step S1004 and the correction step set in Step S1005. After that, the logic operation circuit 17 brings the process to an end.

The processing routines of Steps S1004 and 1005 of FIG. 10, which constitute part of the gist of the present invention, will be described in more detail with reference to FIGS. 10, 11 and 12.

Figure 11:
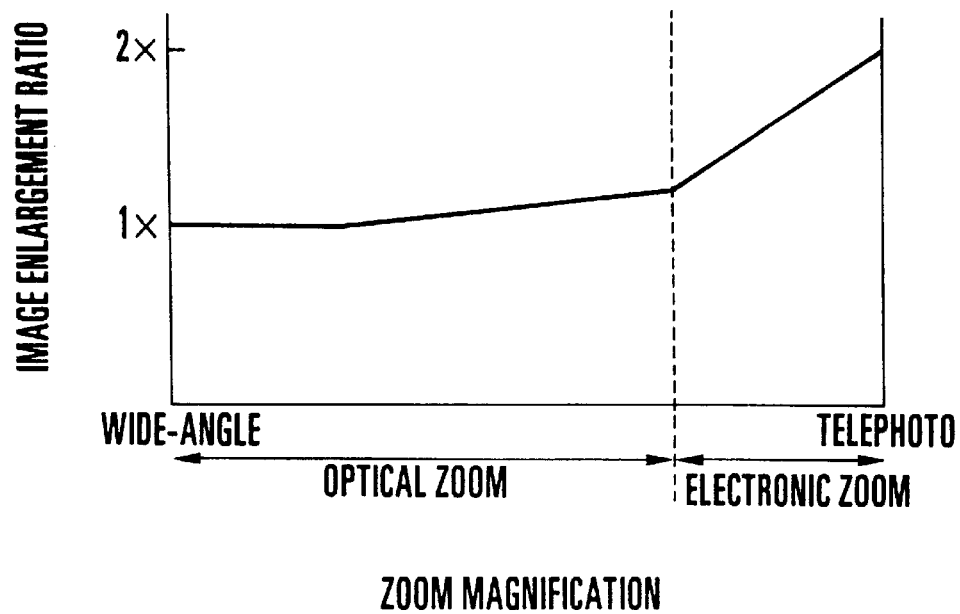
FIG. 11 is a view showing one example of setting of an image enlargement ratio for image-shake correction with respect to a variation of a zoom magnification in the image-shake correcting device according to the sixth embodiment.

FIG. 11 is a view showing one example of setting of the image enlargement ratio for image-shake correction with respect to a variation of a zoom magnification. In FIG. 11, the vertical and horizontal axes represent the image enlargement ratio and the zoom magnification, respectively. The zoom magnification is a magnification which is set by a photographer manipulating a zoom magnification setting switch (not shown), and if there are an optical-zoom zone and an electronic-zoom zone, as in the case of the sixth embodiment, the zoom magnification will be a magnification obtained by multiplying an optical-zoom magnification by an electronic-zoom magnification.

In general, if image-shake correction is to be electronically performed, it is necessary to enlarge an image to gain a correction range. In principle, as the image enlargement ratio is made larger, the correction range becomes wider. However, it is well known that even a small extent of image enlargement brings about a degradation in image quality. In addition, the amplitude of an image shake greatly depends on the zoom magnification and becomes smaller toward a wide-angle end. Accordingly, in Step S1004 of FIG. 10, if image-shake correction is performed at an image enlargement ratio of 1×, as shown in FIG. 11, without enlarging an image on a wide-angle side of the optical-zoom zone, the frequency of occurrence of resolution degradation is reduced.

Figure 12:
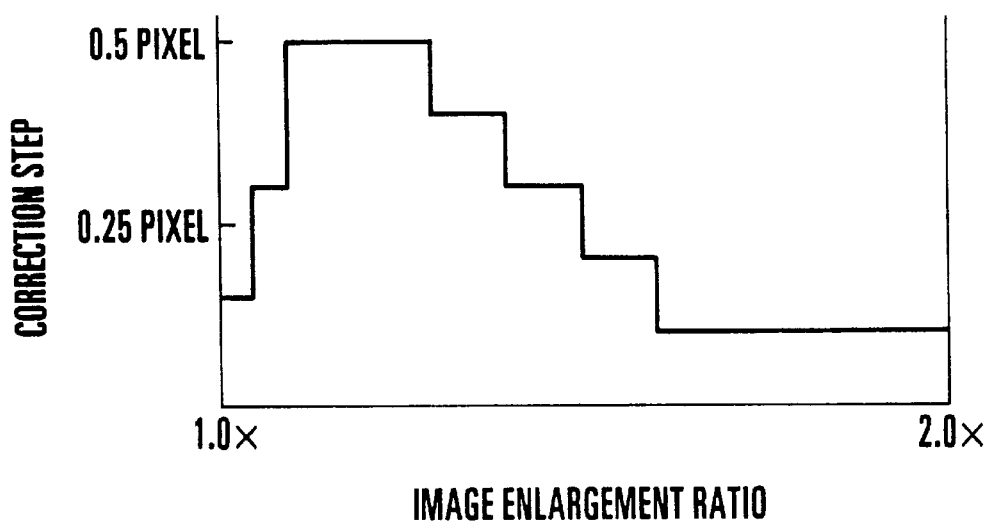
FIG. 12 is a view showing one example of setting of a correction step with respect to a variation of an image enlargement ratio in the image-shake correcting device according to the sixth embodiment.

FIG. 12 is a view showing one example of setting of the correction step with respect to a variation of the image enlargement ratio. In FIG. 12, the vertical and horizontal axes represent the correction step and the image enlargement ratio, respectively. The correction step is the minimum unit in which an image is shifted, and is normally set according to the accuracy of detection of an image shake. However, it has been found out that as the correction step is made smaller, a movement of a position at which a resolution degradation occurs due to image enlargement processing becomes more noticeable. Since such a movement is not similarly noticeable at all image enlargement ratios, it is possible to reduce a moiré noise by increasing a correction step at an image enlargement ratio of approximately 1.1× at which the movement is most noticeable, as shown in FIG. 12.

(Seventh Embodiment)

A seventh embodiment of the present invention will be described below with reference to FIG. 13.

Figure 13:
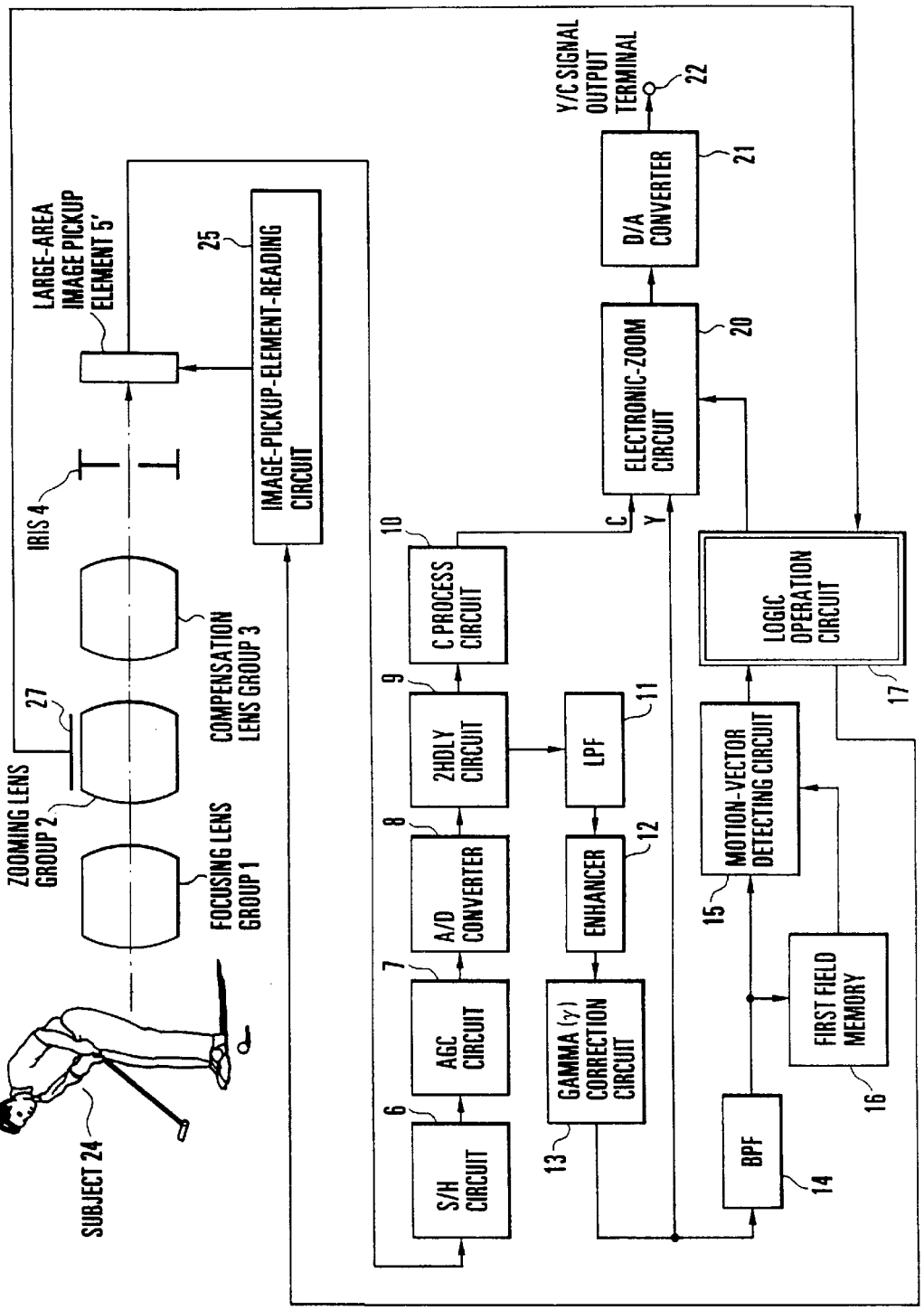
FIG. 13 is a block diagram showing the arrangement of a video camera which is an image pickup apparatus provided with an image-shake correcting device according to a seventh embodiment of the present invention.

FIG. 13 is a block diagram showing the arrangement of a video camera provided with an image-shake correcting device according to the seventh embodiment of the present invention. In FIG. 13, identical reference numerals are used to denote constituent parts identical to those used in the above-described sixth embodiment shown in FIG. 9. The arrangement shown in FIG. 13 differs from that shown in FIG. 9 in that the image pickup element 5, the memory-reading controlling circuit 18 and the second field memory 19 are omitted from the arrangement shown in FIG. 9 and, instead, the large-area image pickup element 5', having a larger area than a normal image pickup element, and the image-pickup-element reading circuit 25 are provided. The large-area image pickup element 5' and the image-pickup-element reading circuit 25 constitute first correcting means which has a feedback loop and serves to correct an image shake. The image-pickup-element reading circuit 25 varies the reading address of the large-area image pickup element 5' to cut out an image from an arbitrary area of the large-area image pickup element 5', thereby effecting image-shake correction.

The other arrangement, operation, effects and advantages of the seventh embodiment are substantially identical to those of the sixth embodiment described previously, and description thereof is omitted.

As is apparent from the above detailed description, in accordance with each of the first to seventh embodiments, there is provided an image-shake correcting device capable of electronically correcting an image shake, which allows a photographer to arbitrarily vary an image enlargement ratio to be used during image-shake correction. In addition, in the image-shake correcting device, since the correction step with which an image shake is corrected can be set to an optimum state according to the image enlargement ratio, it is possible to minimize a resolution degradation and noise due to a movement of the position of occurrence of the resolution degradation. Accordingly, it is possible to achieve the advantage of minimizing an image degradation due to image-shake correction.

Eighth to twelfth embodiments of the present invention will be described below.

According to the eighth to twelfth embodiments, there is provided an image-shake correcting device which includes motion-vector detecting means for detecting a motion vector relative to images, electronic correcting means for electronically correcting an image shake on the basis of the motion vector detected by the motion-vector detecting means, and control means for controlling both a correction step and an image enlargement ratio of the electronic correcting means on the basis of the value of the motion vector to set the correction step and the image enlargement ratio to their respective optimum states.

According to the eighth to twelfth embodiments, there is provided an image-shake correcting device which includes motion-vector detecting means for detecting a motion vector relative to images, absolute-deviation computing means for computing an absolute deviation from a reference point of a current image on the basis of the motion vector detected by the motion-vector detecting means, electronic correcting means for electronically correcting an image shake on the basis of the absolute deviation computed by the absolute-deviation computing means, and control means for controlling both a correction step and an image enlargement ratio of the electronic correcting means on the basis of the absolute deviation to set the correction step and the image enlargement ratio to their respective optimum states.

(Eighth Embodiment)

In FIG. 14 which shows the eighth embodiment of the present invention, identical reference numeral are used to denote constituent parts identical to those of the first embodiment shown in FIG. 1, and description thereof is omitted. In the eighth embodiment, the image-enlargement-ratio input switch 23 is omitted from the arrangement shown in FIG. 1, and a logic operation circuit 117 has a processing program different from that of the logic operation circuit 17 shown in FIG. 1.

The logic operation circuit 117 performs the operation of controlling, on the basis a motion vector outputted from the motion-vector detecting circuit 15, the operation of the memory-reading controlling circuit 18 in the direction of the motion vector, shifting an image reading position of the second field memory 19 from which an image is to be read out, and correcting a movement of the image. The logic operation circuit 117 also performs the operation of executing optimum control of the correction step of the memory-reading controlling circuit 18 and the image enlargement ratio of the electronic-zoom circuit 20 in accordance with the magnitude of the motion vector.

The operation of the image pickup apparatus having the above-described arrangement will be described below.

An image of the subject 24 sequentially passes through the lens groups 1 to 3 and the iris 4 and is formed on the image pickup surface of the image pickup element 5. The formed image of the subject 24 is photoelectrically converted by the image pickup element 5. The S/H circuit 6 holds the output signal of the image pickup element 5, and the AGC circuit 7 executes automatic gain control. The A/D converter 8 performs A/D conversion of the output signal of the AGC circuit 7. The 2HDLY circuit 9 separates the color-difference line-sequential signal outputted from the image pickup element 5 into a 1H delayed signal and a 2H delayed signal, and sends the respective 1H and 2H delayed signals to the luminance signal processing part (which includes the LPF 11 and so on) and the chrominance signal processing part (which includes the C process circuit 10 and so on). The 2H delayed signal sent to the chrominance signal processing part is inputted to the C process circuit 10, and the C process circuit 10 generates the chrominance signal C and writes the chrominance signal C into the second field memory 19.

In the meantime, the 1H delayed signal sent to the luminance signal processing part is inputted to the LPF 11, and the LPF 11 eliminates a carrier component from the color-difference line-sequential signal to perform separation of the luminance signal Y. The enhancer 12 performs the processing of enhancing the high-frequency component of the luminance signal Y, such as the edge of the image of the subject 24, for the purpose of improving image quality. Normally, in such processing, a quadratic differential of the video signal (luminance signal Y) is added to the original luminance signal Y. Then, the gamma correction circuit 13 executes the processing of preventing saturation of the high-light portion of the luminance signal Y and expanding the dynamic range thereof. The BPF 14 extracts a spatial frequency component which is useful for detecting a motion vector.

Since the high- and low-frequency components of an image signal are generally unsuitable for detecting a motion vector, they are eliminated by the BPF 14. In the eighth embodiment, only a sign bit is outputted from the BPF 14. This means that the luminance signal Y is converted into a two-level signal by using a DC level as a threshold. Accordingly, the luminance signal Y which has passed through the BPF 14 is a two-level signal represented by one bit.

The motion-vector detecting circuit 15 detects a motion vector of the image on the basis of the signals inputted from the BPF 14 and the first field memory 16, and inputs the detected motion vector signal to the logic operation circuit 117. The logic operation circuit 117 calculates a deviation from a reference position of the image at that time instant in accordance with the flowchart shown in FIG. 15 which will be described later, on the basis of the motion vector signal (the horizontal and vertical components of a motion vector at a predetermined position in the picture). Then, the memory-reading controlling circuit 18 controls the image reading position of the second field memory 19 with a correction step according to the image enlargement ratio, and the image outputted from the second field memory 19 is enlarged at a predetermined image enlargement ratio by the electronic-zoom circuit 20. In this manner, the image whose image shake is finally corrected is obtained. The corrected image signal is D/A converted by the D/A converter 21, and the analog signal is outputted through the signal output terminal 22.

Figure 15:
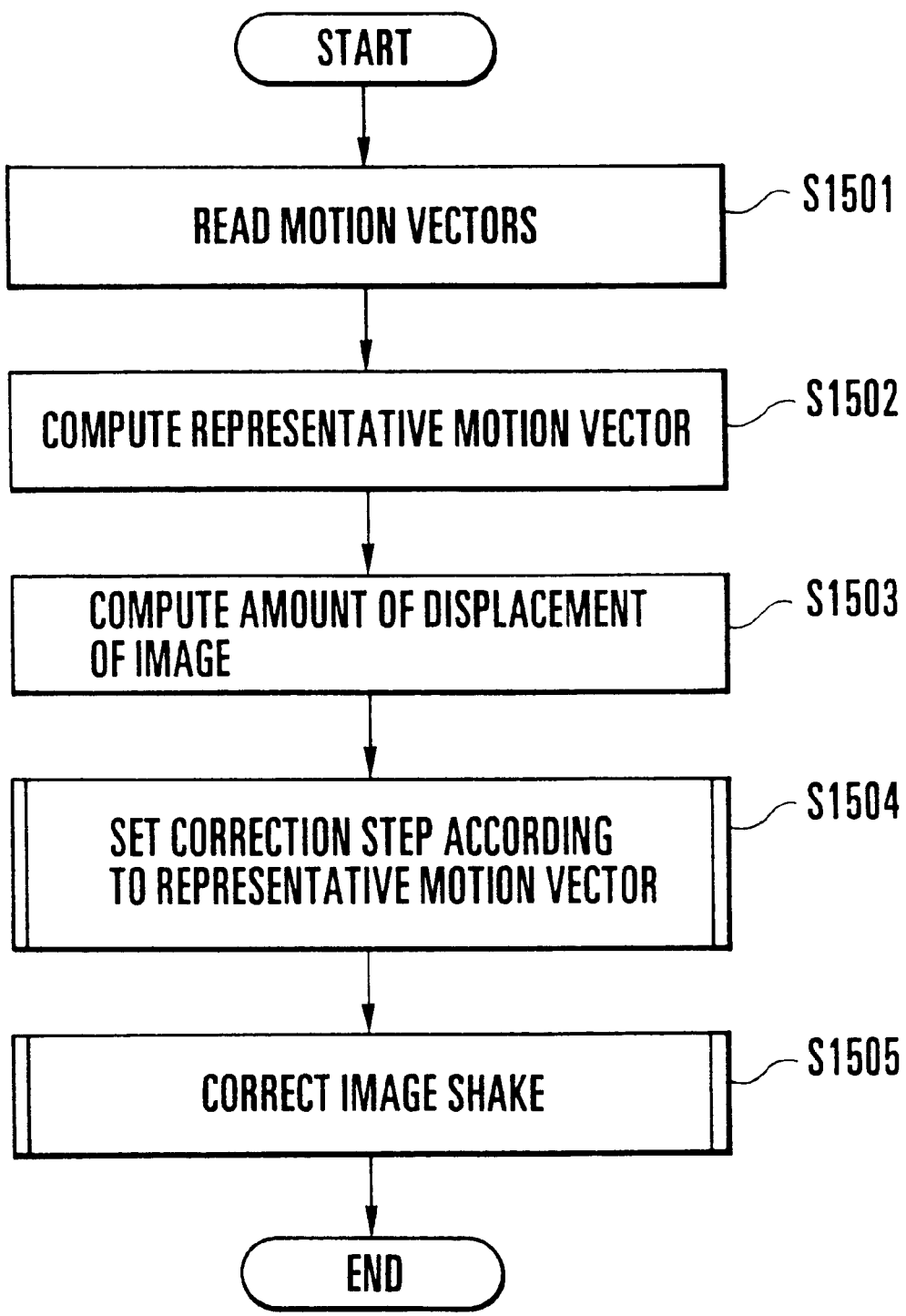
FIG. 15 is a flowchart showing the control operation of a logic operation circuit provided in the image-shake correcting device shown in FIG. 14.

The operation of the logic operation circuit 117 provided in the image-shake correcting device according to the eighth embodiment will be described below with reference to FIGS. 14 and 15. FIG. 15 is a flowchart showing the operation of the logic operation circuit 117. In Step S1501 of FIG. 15, the logic operation circuit 117 reads the output signal of the motion-vector detecting circuit 15 (the horizontal and vertical components of a motion vector at a predetermined position in a picture) on field-by-field basis. Then, the process proceeds to Step S1502, in which the logic operation circuit 117 detects a movement of an image in the plurality of pictures read in Step S1501 at a plurality of positions per picture and performs predetermined processing on motion vectors at the plurality of positions, thereby computing one representative motion vector. The predetermined processing includes the processing of evaluating the reliability of each of the motion vectors, the process of determining a target area to be controlled, averaging process and the like.

Then, the process proceeds to Step S1503, in which the logic operation circuit 117 integrates the representative motion vector to find a deviation from a reference position in the picture (the amount of displacement of the image), thereby producing an image-shake correction signal. Then, the process proceeds to Step S1504, in which the logic operation circuit 117 sets the correction step of the memory-reading controlling circuit 18 to an optimum state according to an absolute value of the representative motion vector computed in Step S1502. Then, the process proceeds to Step S1505, in which image-shake correction is executed by moving the image with the correction step set in Step S1504. After that, the logic operation circuit 117 brings the process to an end.

The processing routines of Step S1504 of FIG. 15, which constitute part of the gist of the present invention, will be described in more detail with reference to FIGS. 14 and 16.

FIG. 16 is a view showing the relation between the representative motion vector and a correction step optimum therefor. In FIG. 16, the vertical and horizontal axes represent the correction step and the representative motion vector, respectively. In FIG. 16, the representative motion vector represents the relative displacement between a current image and an image which immediately precedes the current image. The correction step is the minimum unit in which an image is shifted, and is normally set according to the accuracy of detection of a motion vector. However, it has been found out that as the correction step is made smaller to move an image in finer steps, a movement of a position at which a resolution degradation occurs due to image enlargement processing becomes more noticeable.

As shown in FIG. 16, as the representative motion vector has a larger magnitude, i.e., an image shake becomes larger, the degree of fineness to which an image is corrected becomes less significant. Accordingly, as the magnitude of the representative motion vector becomes larger, the correction step is made larger to make the movement of the position of occurrence of the resolution degradation less noticeable. Contrarily, as the representative motion vector has a smaller magnitude, i.e., the image shake becomes smaller, the awkwardness with which the image is corrected becomes more noticeable. Accordingly, as the magnitude of the representative motion vector becomes smaller, the correction step is made smaller so that it is possible to reduce a resolution degradation as well as a noise due to a movement of a position at which the resolution degradation occurs.

According to the eighth embodiment, there is provided an image-shake correcting device capable of electronically correcting an image shake, in which, since the correction step (shifting step) with which the image shake is corrected can be set to an optimum state according to the absolute value of a representative motion vector, i.e., the degree of the image shake, it is possible to minimize a resolution degradation and a noise due to a movement of a position at which the resolution degradation occurs. Accordingly, it is possible to achieve the advantage of minimizing an image degradation due to image-shake correction.

(Ninth Embodiment)

The ninth embodiment of the present invention will be described below with reference to FIG. 17. FIG. 17 is a view showing the relation between a representative motion vector and a correction step optimum therefor in an image-shake correcting device according to the ninth embodiment. In the ninth embodiment, the relation between the representative motion vector and the correction step optimum therefor is made to vary not stepwise as in the case of the eighth embodiment but in a manner expressed by an exponential function. It is possible, therefore, to achieve a smoother variation of such relation.

Incidentally, the other arrangement, operation, effects and advantages of the ninth embodiment are substantially identical to those of the eighth embodiment described previously, and description thereof is omitted.

(Tenth Embodiment)

Figure 18:
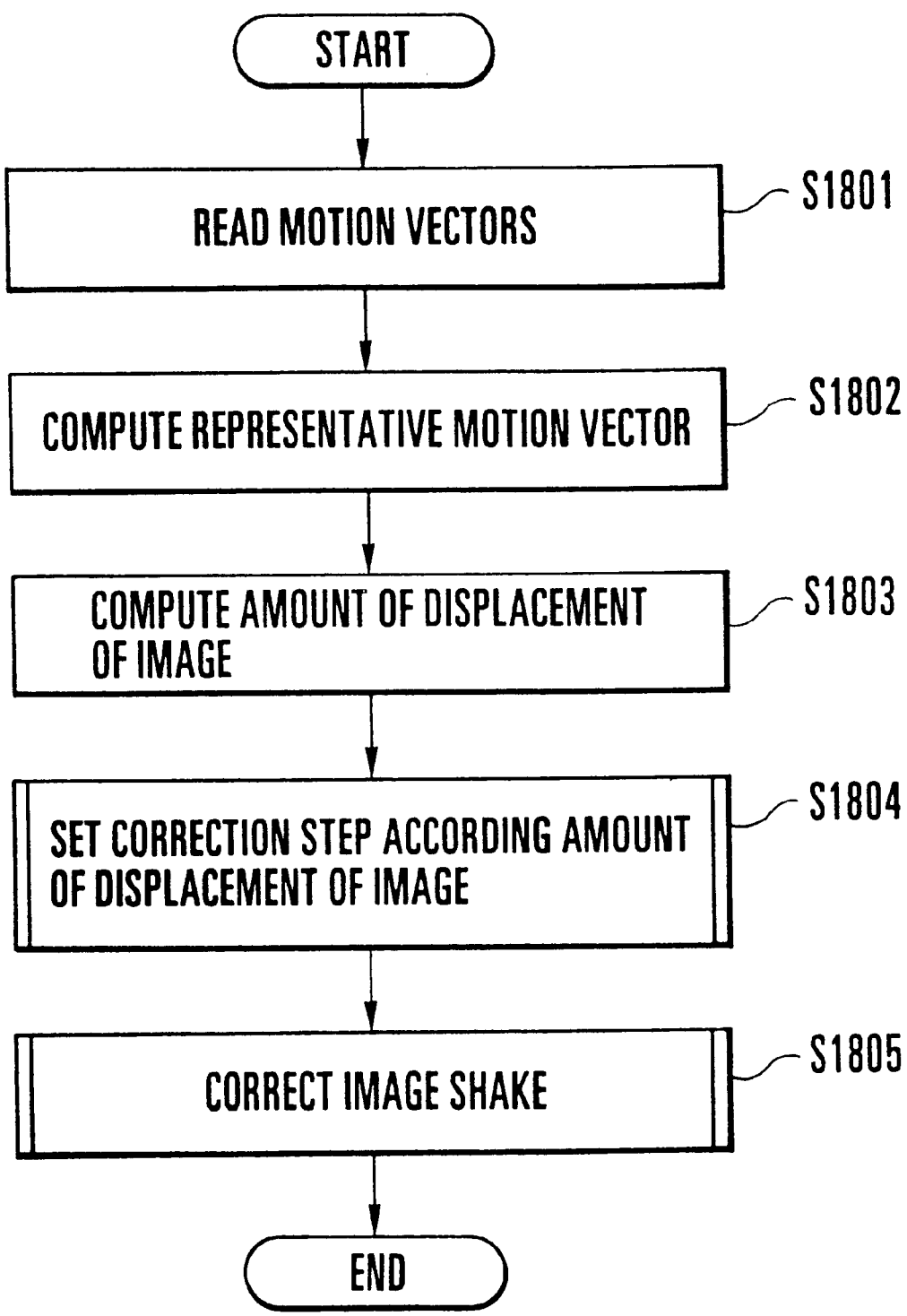
FIG. 18 is a flowchart showing the control operation of a logic operation circuit provided in an image-shake correcting device according to a tenth embodiment of the present invention.

The tenth embodiment of the present invention will be described below with reference to FIGS. 18 and 19. The arrangement of a video camera which is an image pickup apparatus provided with an image-shake correcting device according to the tenth embodiment of the present invention is substantially identical to that of the previously-described eighth embodiment shown in FIG. 14, and the following description will be made with reference to FIG. 14 as well. FIG. 18 is a flowchart showing the operation of the logic operation circuit 117 provided in the image-shake correcting device according to the tenth embodiment. In Step S1801 of FIG. 18, the logic operation circuit 117 reads the output signal of the motion-vector detecting circuit 15 (the horizontal and vertical components of a motion vector at a predetermined position in a picture) on field-by-field basis. Then, the process proceeds to Step S1802, in which the logic operation circuit 117 performs predetermined processing on the read plurality of motion vectors at positions in a plurality of fields, thereby computing one representative motion vector. The predetermined processing includes the process of evaluating the reliability of each of the motion vectors, the process of determining a target area to be controlled, and the like.

Then, the process proceeds to Step S1803, in which the logic operation circuit 117 integrates the representative motion vector to find a deviation from a reference position in the picture (the amount of displacement of the image), thereby producing an image-shake correction signal. Then, the process proceeds to Step S1804, in which the logic operation circuit 117 sets the correction step of the memory-reading controlling circuit 18 to an optimum state on the basis of an absolute value of the deviation of the image calculated in Step S1803. Then, the process proceeds to Step S1805, in which image-shake correction is executed by moving the image with the correction step set in Step S1804. After that, the logic operation circuit 117 brings the process to an end.

The processing of Step S1804, which constitutes part of the gist of the present invention, will be described in more detail with reference to FIGS. 14 and 19.

Figure 19:
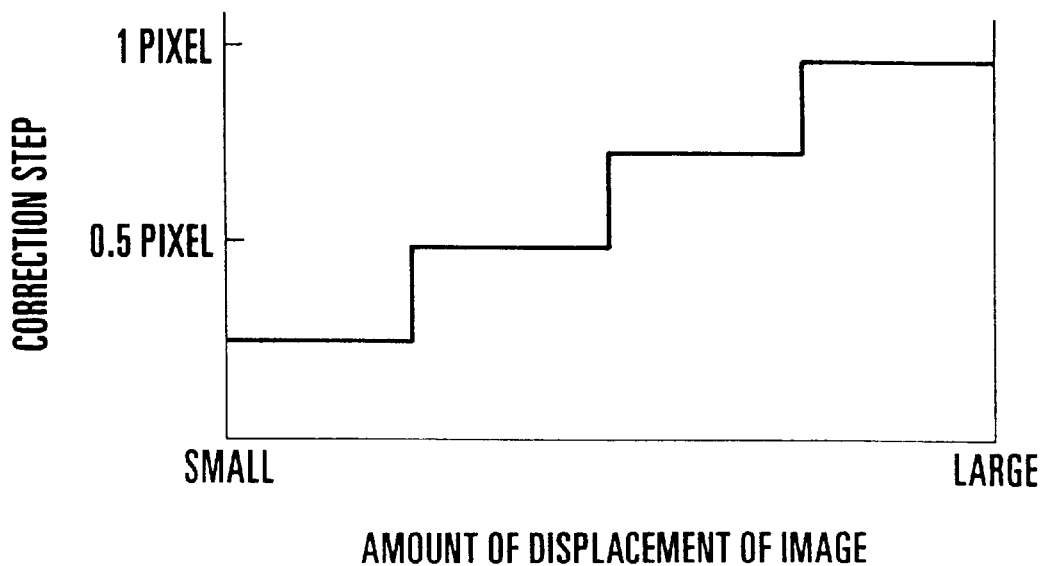
FIG. 19 is a view showing one example of setting of a correction step with respect to the amount of displacement of an image in the image-shake correcting device according to the tenth embodiment.

FIG. 19 is a view showing the relation between the amount of displacement of the image and a correction step optimum therefor. In FIG. 19, the vertical axis and the horizontal axis represent the correction step and the amount of displacement of the image, respectively. The amount of displacement of the image represents the relative position of the current image with respect to a predetermined reference position. The correction step is the minimum unit in which an image is shifted, and is normally set according to the accuracy of detection of a motion vector. However, it has been found out that as the correction step is made smaller to move an image in finer steps, a movement of a position at which a resolution degradation occurs due to image enlargement processing becomes more noticeable.

As shown in FIG. 19, as the representative motion vector has a larger magnitude, i.e., an image shake becomes larger, the degree of fineness to which an image is corrected becomes less significant. Accordingly, as the magnitude of the representative motion vector becomes larger, the correction step is made larger to make the movement of the position of occurrence of the resolution degradation less noticeable. Contrarily, as the representative motion vector has a smaller magnitude, i.e., the image shake becomes smaller, the awkwardness with which the image is corrected becomes more noticeable. Accordingly, as the magnitude of the representative motion vector becomes smaller, the correction step is made smaller so that it is possible to reduce a resolution degradation as well as a noise due to a movement of a position at which the resolution degradation occurs.

According to the tenth embodiment, there is provided an image-shake correcting device capable of electronically correcting an image shake, in which since the correction step with which the image shake is corrected can be set to an optimum state according to the amount of displacement of an image, i.e., the degree of the image shake, it is possible to minimize a resolution degradation and a noise due to a movement of a position at which the resolution degradation occurs. Accordingly, it is possible to achieve the advantage of minimizing an image degradation due to image-shake correction.

(Eleventh Embodiment)

Figure 20:
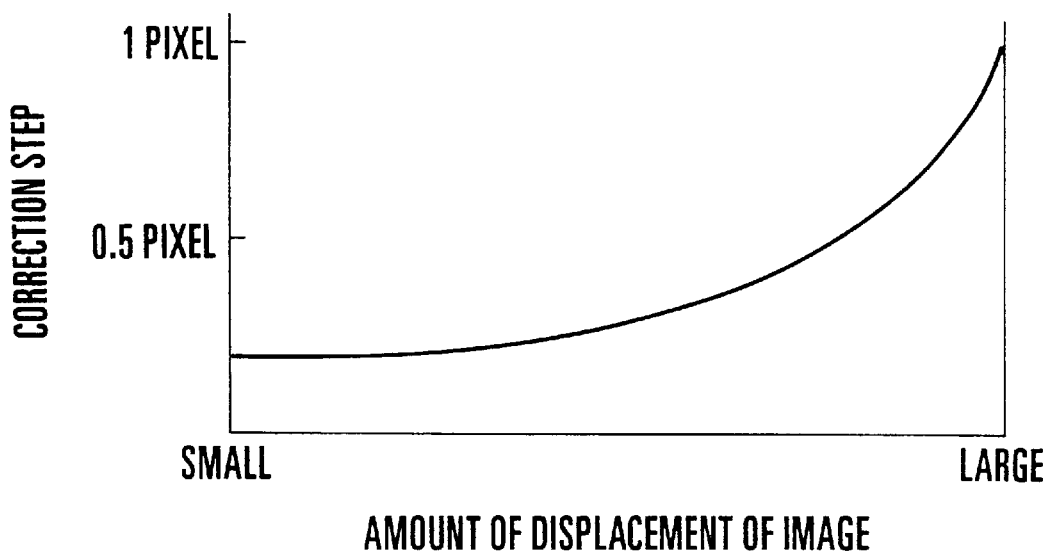
FIG. 20 is a view showing one example of setting of a correction step with respect to the amount of displacement of an image in an image-shake correcting device according to an eleventh embodiment.

The eleventh embodiment of the present invention will be described below with reference to FIG. 20. FIG. 20 is a view showing the relation between the amount of displacement of an image and a correction step optimum therefor in an image-shake correcting device according to the eleventh embodiment. In the eleventh embodiment, the relation between the amount of displacement of the image and the correction step optimum therefor is made to vary not stepwise, as in the case of the tenth embodiment, but in a manner expressed by an exponential function. It is possible, therefore, to achieve a smoother variation of such relation.

Incidentally, the other arrangement, operation, effects and advantages of the ninth embodiment are substantially identical to those of the tenth embodiment described previously, and description thereof is omitted.

(Twelfth Embodiment)

Although the description of each of the eight to eleventh embodiments has referred to the image-shake correcting device arranged to perform image-shake correction by using a field memory, the present invention is not limited to such an arrangement. For example, the present invention can be applied to an image-shake correcting device which is arranged to perform image-shake correction by using, instead of the field memory, a large-area image pickup element having a larger area than a normal image pickup element.

FIG. 21 is a block diagram showing the arrangement of a video camera provided with an image-shake correcting device according to the twelfth embodiment of the present invention. In FIG. 21, identical reference numerals are used to denote constituent parts identical to those used in the above-described eighth embodiment shown in FIG. 14. The arrangement shown in FIG. 21 differs from that shown in FIG. 14 in that the image pickup element 5, the memory-reading controlling circuit 18 and the second field memory 19 are omitted from the arrangement shown in FIG. 14 and, instead, the large-area image pickup element 5' having a larger area than a normal image pickup element and the image-pickup-element reading circuit 25 are provided. The large-area image pickup element 5' and the image-pickup-element reading circuit 25 constitute correcting means which has a feedback loop and serves to correct an image shake. The image-pickup-element reading circuit 25 varies the reading address of the large-area image pickup element 5' to cut out an image from an arbitrary area of the large-area image pickup element 5', thereby effecting image-shake correction.

As is apparent from the foregoing detailed description, according to each of the above-described embodiments, there is provided an image-shake correcting device capable of electronically correcting an image shake, in which since the correction step with which the image shake is corrected can be set to an optimum state according to the degree of the image shake, it is possible to minimize a resolution degradation and a noise due to a movement of a position at which the resolution degradation occurs. Accordingly, it is possible to achieve the advantage of minimizing an image degradation due to image-shake correction.

What is claimed is:

1. An image-shake correcting device comprising:
   (a) motion-vector detecting means for detecting a motion vector;
   (b) electronic correcting means for electronically correcting image shake of an image by a predetermined correction step by unit on the basis of an output of said motion-vector detecting means; and
   (c) control means for changing a unit value of the predetermined correction step of said electronic correcting means on the basis of a magnitude of the motion vector detected by said motion-vector detecting means.

2. An image-shake correcting device according to claim 1, further comprising image pickup means, said motion-vector detecting means detecting a motion vector of an image from a pickup image signal output from said image pickup means.

3. An image-shake correcting device according to claim 1, wherein said electronic correcting means has an image memory for storing the image and corrects image shake by shifting an image reading position of said image memory in a direction of the motion vector output from said motion-vector detecting means.

4. An image-shake correcting device according to claim 3, wherein said electronic correcting means includes computing means for computing an absolute deviation from a reference position of the image on the basis of the motion vector detected by said motion-vector detecting means, and corrects image shake by shifting the image reading position of said image memory on the basis of the absolute deviation.

5. An image-shake correcting device according to claim 1, wherein said control means makes the unit of the correction step of said electronic correcting means larger if the motion vector is larger, whereas if the motion vector is smaller, said control means makes the unit of the correction step of said electronic correcting means smaller.

6. An image-shake correcting device according to claim 5, wherein said control means varies the unit of the correction step in a manner represented by an exponential function.

7. An image-shake correcting device comprising:

(a) motion-vector detecting means for detecting a motion vector;

(b) electronic correcting means, having an image memory for storing an image, and arranged for correcting image shake by shifting an image reading position of said image memory by a predetermined step by unit in a direction of the motion vector output from said motion-vector detecting means; and (c) control means for changing a unit value of the predetermined step of said electronic correcting means on the basis of a magnitude of the motion vector detected by said motion-vector detecting means.

8. An image-shake correcting device according to claim 7, further comprising image pickup means, said motion-vector detecting means detecting a motion vector of the image from a pickup image signal output from said image pickup means.

9. An image-shake correcting device according to claim 8, wherein said electronic correcting means includes computing means for computing an absolute deviation from a reference position of the image on the basis of the motion vector detected by said motion-vector detecting means, and corrects image shake by shifting the image reading position of said image memory on the basis of the absolute deviation.

10. An image-shake correcting device according to claim 9, wherein said control means makes the unit of the correction step of said electronic correcting means smaller if the absolute deviation is smaller, whereas if the absolute deviation is larger, said control means makes the unit of the correction step of said electronic correcting means larger.

11. An image-shake correcting device according to claim 10, wherein said control means varies the unit of the correction step in a manner represented by an exponential function.

* * * * *

UNITED STATES PATENT AND TRADEMARK OFFICE
CERTIFICATE OF CORRECTION

PATENT NO. : 6,424,372 B1
DATED : July 23, 2002
INVENTOR(S) : Kitahiro Kaneda et al.

It is certified that error appears in the above-identified patent and that said Letters Patent is hereby corrected as shown below:

<u>Title page,</u>
Item [75], Inventor, "Kitahiro Kaneda, Kanagawa-ken" should read
-- Kitahiro Kaneda, Yokohama; --.

Item [57], ABSTRACT,
Line 9, "on-the" should read -- on the --.

Item [56], References Cited, FOREIGN PATENT DOCUMENTS,
"6-237411    8/1994
4-352574    12/ 1994
63-166370   7/1998"

should read

-- 63-166370   7/1988
 4-352574    12/1992
 6-237411    8/1994 --.

<u>Column 4,</u>
Line 5, "-representative" should read -- representative --.

<u>Column 7,</u>
Line 24, "processing" should read -- process --.

<u>Column 9,</u>
Line 49, "process includes the processing" should read -- processing includes the process --.

<u>Column 10,</u>
Line 2, "will." should read -- will --.

UNITED STATES PATENT AND TRADEMARK OFFICE
CERTIFICATE OF CORRECTION

PATENT NO.   : 6,424,372 B1
DATED        : July 23, 2002
INVENTOR(S)  : Kitahiro Kaneda et al.

It is certified that error appears in the above-identified patent and that said Letters Patent is hereby corrected as shown below:

<u>Column 11,</u>
Line 54, "process includes the processing" should read -- processing includes the process --.
Line 60, "displacement-of" should read -- displacement of --.

<u>Column 14,</u>
Line 2, "basis a" should read -- basis of a --.

<u>Column 15,</u>
Line 28, "processing" ($2^{nd}$ occurrence) should read -- process --.

Signed and Sealed this

Eleventh Day of March, 2003

JAMES E. ROGAN
*Director of the United States Patent and Trademark Office*